(12) United States Patent
Nagaraj et al.

(10) Patent No.: US 8,654,833 B2
(45) Date of Patent: Feb. 18, 2014

(54) EFFICIENT TRANSFORMATION TECHNIQUES FOR VIDEO CODING

(75) Inventors: Raghavendra C. Nagaraj, San Diego, CA (US); De Dzwo Hsu, San Diego, CA (US); Stephen Molloy, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1066 days.

(21) Appl. No.: 11/861,804

(22) Filed: Sep. 26, 2007

(65) Prior Publication Data

US 2009/0080515 A1     Mar. 26, 2009

(51) Int. Cl.
 *H04N 7/12* (2006.01)
(52) U.S. Cl.
 USPC .................................................. 375/240.01
(58) Field of Classification Search
 USPC ............... 375/240.01–240.26; 382/232–236, 382/239–250
 See application file for complete search history.

(56) References Cited

U.S. PATENT DOCUMENTS

| | | | | |
|---|---|---|---|---|
| 5,197,021 | A * | 3/1993 | Cucchi et al. ................ | 708/401 |
| 5,894,430 | A * | 4/1999 | Ohara ........................... | 708/402 |
| 6,181,831 | B1 * | 1/2001 | Sadjadian ..................... | 382/276 |
| 6,414,992 | B1 * | 7/2002 | Sriram et al. ............. | 375/240.13 |
| 7,630,435 | B2 * | 12/2009 | Chen et al. ............... | 375/240.03 |
| 7,756,351 | B2 * | 7/2010 | Dang ............................ | 382/250 |
| 2007/0168410 | A1 * | 7/2007 | Reznik ......................... | 708/490 |
| 2007/0233764 | A1 * | 10/2007 | Reznik et al. ................ | 708/402 |
| 2008/0107176 | A1 * | 5/2008 | Chatterjee et al. ....... | 375/240.14 |

FOREIGN PATENT DOCUMENTS

| | | |
|---|---|---|
| CN | 1564602 A | 1/2005 |
| CN | 1889690 A | 1/2007 |
| EP | 0809193 | 11/1997 |
| EP | 1544797 | 6/2005 |
| GB | 2305798 A | 4/1997 |
| JP | 7200539 A | 8/1995 |
| JP | 9154134 A | 6/1997 |
| JP | 2000222578 A | 8/2000 |
| JP | 2005184829 A | 7/2005 |
| TW | I272848 B | 2/2007 |
| WO | WO0045602 | 8/2000 |
| WO | WO2005086981 A2 | 9/2005 |

OTHER PUBLICATIONS

Parhi, K., "Video Data Format Converters Using Minimum No. Of Registers", IEEE Trans. on Circuit and System for Video Technology, 2(2): 255-267, Jun. 1992.
Huang, Y.-W. et al., "A 1.3TOPS H.264/AVC Single-Chip Encoder for HDTV Applications", IEEE International Solid-State Circuits Conference, 2005.

(Continued)

*Primary Examiner* — Dmitry H Levitan
(74) *Attorney, Agent, or Firm* — Espartaco Diaz Hidalgo; Brent Boyd

(57) ABSTRACT

This disclosure describes efficient transformation techniques that can be used in video coding. In particular, intermediate results of computations associated with transformation of a first block of video data are reused in the transformation of a second block of video data. The techniques may be used during a motion estimation process in which video blocks of a search space are transformed, but this disclosure is not necessarily limited in this respect. Pipelining techniques may be used to accelerate the efficient transformation techniques, and transposition memories can be implemented to facilitate efficient pipelining.

27 Claims, 12 Drawing Sheets

(56) References Cited

OTHER PUBLICATIONS

Yang, K.-M. et al., "A Family of VLSI Designs for the Motion Compensation Block-Matching Algorithm", IEEE Trans. on Circuits and Systems, 36(10): 1317-1325, Oct. 1989.

International Search Report and Written Opinion—PCT/US2008/077988—International Search Authority, European Patent Office, Nov. 12, 2010.

Sullivan G. J., et al., "Rate-Distortion Optimization for Video Compression" IEEE Signal Processing Magazine, IEEE Service Center, Piscataway, NJ, US, vol. 15, No. 6, Nov. 1, 1998, pp. 74-90, XP011089821 ISSN: 1053-5888 the whole document.

* cited by examiner (a) MATRIX REFER.

| 00 | 01 | 02 | 03 |
|----|----|----|----|
| 10 | 11 | 12 | 13 |
| 20 | 21 | 22 | 23 |
| 30 | 31 | 32 | 33 |

(b) VER. I/P SEQ.

| 1 | 5 | 9  | 13 |
|---|---|----|----|
| 3 | 7 | 11 | 15 |
| 4 | 8 | 12 | 16 |
| 2 | 6 | 10 | 14 |

1) $s_{00}$  9) $s_{02}$
2) $s_{30}$  10) $s_{32}$
3) $s_{10}$  11) $s_{12}$
4) $s_{20}$  12) $s_{22}$
5) $s_{01}$  13) $s_{03}$
6) $s_{31}$  14) $s_{33}$
7) $s_{11}$  15) $s_{13}$
8) $s_{21}$  16) $s_{23}$ (c) VER. O/P SEQ.

| 1 | 5 | 9  | 13 |
|---|---|----|----|
| 3 | 7 | 11 | 15 |
| 2 | 6 | 10 | 14 |
| 4 | 8 | 12 | 16 |

1) $S'_{00}$  9) $S'_{02}$
2) $S'_{20}$  10) $S'_{22}$
3) $S'_{10}$  11) $S'_{12}$
4) $S'_{30}$  12) $S'_{32}$
5) $S'_{01}$  13) $S'_{03}$
6) $S'_{21}$  14) $S'_{23}$
7) $S'_{11}$  15) $S'_{13}$
8) $S'_{31}$  16) $S'_{33}$ (d) HOR. I/P SEQ.

| 1  | 2  | 3  | 4  |
|----|----|----|----|
| 5  | 6  | 7  | 8  |
| 9  | 10 | 11 | 12 |
| 13 | 14 | 15 | 16 |

EFFICIENT TRANSFORMATION TECHNIQUES FOR VIDEO CODING

BACKGROUND

1. Field of the Invention

This disclosure relates to digital video processing and, more particularly, block-based coding of video data.

2. Description of Related Art

Video capabilities can be incorporated into a wide range of devices, including digital televisions, digital direct broadcast systems, wireless communication devices, personal digital assistants (PDAs), laptop computers, desktop computers, digital cameras, digital recording devices, cellular or satellite radio telephones, video game counsels, handheld gaming devices, and the like. Digital video coding can provide significant improvements over conventional analog systems in creating, modifying, transmitting, storing, recording and playing full motion multimedia sequences. Broadcast networks may use video coding to facilitate the broadcast of one or more channels of multimedia (audio-video) sequences to wireless subscriber devices. Video coding is also used to support video telephony (VT) applications, such as video conferencing by cellular radio telephones.

A number of different coding standards have been established for coding digital video sequences. The Moving Picture Experts Group (MPEG), for example, has developed a number of standards including MPEG-1, MPEG-2 and MPEG-4. Other standards include the International Telecommunication Union (ITU) H.263 standard and H.264 standard, QuickTime™ technology developed by Apple Computer of Cupertino Calif., Video for Windows™ developed by Microsoft Corporation of Redmond, Wash., Indeo™ developed by Intel Corporation, RealVideo™ from RealNetworks, Inc. of Seattle, Wash., and Cinepak™ developed by Super-Mac, Inc. Furthermore, new standards continue to emerge and evolve. The ITU H.264 standard is also set forth in MPEG-4, Part 10, Advanced Video Coding (AVC).

Most video coding techniques utilize block-based coding, which divides video frames into blocks of pixels and correlates the blocks with those of other frames in the video sequence. By encoding differences between a current block and a predictive block of another frame, data compression can be achieved. The term "macroblock" is often used to define discrete blocks of a video frame that are compared to a search space (which is typically a subset of a previous or subsequent frame of the video sequence). Macroblocks may also be further sub-divided into partitions or sub-partitions. The ITU H.264 standard supports 16 by 16 macroblocks, 16 by 8 partitions, 8 by 16 partitions, 8 by 8 partitions, 8 by 4 sub-partitions, 4 by 8 sub-partitions and 4 by 4 sub-partitions. Other standards may support differently sized blocks, macroblocks, partitions and/or sub-partitions.

For each block (macroblock, partition or sub-partition) in a video frame, an encoder compares similarly sized blocks of one or more immediately preceding video frames (and/or subsequent frames) to identify a similar block, referred to as the "prediction block" or "best match." The process of comparing a current video block to video blocks of other frames is generally referred to as motion estimation. Once a "best match" is identified for a given block to be coded, the encoder can encode the differences between the current block and the best match. This process of encoding the differences between the current block and the best match includes a process referred to as motion compensation. Motion compensation comprises creating a difference block (referred to as the residual), which includes information indicative of the differences between the current block to be encoded and the best match. In particular, motion compensation usually refers to the act of fetching the best match using a motion vector, and then subtracting the best match from an input block to generate the residual. Additional coding steps, such as entropy coding, may be performed on the residual to further compress the bitstream.

BRIEF SUMMARY

This disclosure describes efficient transformation techniques that can be used in video coding. In particular, intermediate results of computations associated with transformation of a first block of video data are re-used when computing intermediate results of computations associated with the transformation of a second block of video data. The efficient transformation techniques may be used during a motion estimation process in which video blocks of a search space are transformed, but this disclosure is not necessarily limited in this respect. According to this disclosure, a search space may be broken into different 4 by 4 pixel blocks, and the different 4 by 4 pixel blocks may overlap one another.

One-dimensional transforms may be performed on rows of the 4 by 4 pixel blocks to generate intermediate results, and then one-dimensional transforms may be performed on a column of the intermediate results. Alternatively, the one-dimensional transforms may be performed first on the columns, and then on a row of the intermediate results. In any case, given an overlap between different 4 by 4 pixel blocks in the search space, at least some of the intermediate results can be re-used (e.g., shared with later transformations) without performing the same computations. An efficient architecture is also disclosed for implementation of the techniques described herein.

In one example, this disclosure provides a method comprising performing transformations on blocks of video data, wherein performing the transformations includes re-using one or more computations associated with a first transformation of a first block of video data in a second transformation of a second block of video data.

In another example, this disclosure provides a device comprising a video coder that performs transformations on blocks of video data. In performing the transformations, the video coder re-uses one or more computations associated with a first transformation of a first block of video data in a second transformation of a second block of video data.

In another example, this disclosure provides a device comprising means for performing transformations on blocks of video data, and means for re-using one or more computations associated with a first transformation of a first block of video data in a second transformation of a second block of video data.

The techniques described herein may be implemented in hardware, software, firmware, or any combination thereof If implemented in software, the software may be executed in a digital signal processor (DSP) or other type of processor or device. The software that executes the techniques may be initially stored in a computer readable medium, and loaded and executed in the processor or other device to allow for video coding using the techniques described herein.

Accordingly, this disclosure also contemplates a computer-readable medium comprising instructions that, when executed in a video coding device, cause the device to perform transformations on blocks of video data, wherein in performing the transformations the instructions cause the device to re-use one or more computations associated with a first transformation of a first block of video data in a second transformation of a second block of video data.

In addition, this disclosure contemplates a circuit configured to perform transformations on blocks of video data, wherein in performing the transformations the circuit re-uses one or more computations associated with a first transformation of a first block of video data in a second transformation of a second block of video data.

Additionally, as described in greater detail below, pipelining techniques may be used to accelerate the efficient transformation techniques, and transposition memories can be implemented to facilitate efficient pipelining. Additional details of various embodiments are set forth in the accompanying drawings and the description below. Other features, objects and advantages will become apparent from the description and drawings, and from the claims.

BRIEF DESCRIPTION OF DRAWINGS

FIG. 12 is a diagram illustrating a dataflow between a horizontal engine and a vertical engine.

FIG. 13 is a block diagram illustrating timing and data flow in transpose registers that may be between a horizontal engine and a vertical engine.

DETAILED DESCRIPTION OF EMBODIMENTS OF THE INVENTION

This disclosure describes efficient transformation techniques that may be useful in video coding. As described in greater detail below, intermediate results of computations associated with transformation of a first block of video data are re-used in the transformation of a second block of video data. The techniques may be particularly useful for integer transformations or forward discrete cosine transformations performed during a motion estimation process in which video blocks of a search space are transformed. However, the techniques may be used in other transformation contexts associated with video coding. Indeed, the techniques may be useful for any type of linear transformations, integer transformations, and possibly other transformation contexts.

According to this disclosure, a search space (of any size) may be broken into different video blocks, such as 4 by 4 pixel blocks. The different 4 by 4 pixel blocks defined within the search space may overlap one another. As an example, a 5 by 5 pixel search space may define four different 4 by 4 pixel blocks, although interpolation to fractional resolution could be used to define even more 4 by 4 pixel blocks within a 5 by 5 pixel search space. The search space may be used when transforming the 4 by 4 pixel blocks from the pixel domain to the spatial-frequency domain. During this transformation from one domain to another, typically two one-dimensional transformation passes are performed on the 4 by 4 pixel blocks. A first pass is performed on columns to generate horizontal spatial frequency components (referred to as intermediate results), and a second pass is performed on one or more rows to generate vertical spatial frequency components. A person of ordinary skill in the art will recognize that the first pass may be performed on rows and the second pass may be performed on a column just as readily.

One-dimensional transforms may be performed on columns of the 4 by 4 pixel blocks to generate intermediate results, and then one-dimensional transforms may be performed on a row of the intermediate results. Given the overlap between the different 4 by 4 pixel blocks in the search space, at least some of the intermediate results can be re-used without performing the same computations. In this manner, computations can be avoided to promote efficiency. Exemplary hardware architectures are also disclosed that can achieve efficient implementation of the techniques described herein. In this case, pipelining techniques may be used to accelerate the efficient transformation techniques of a set of blocks of video data, and transposition memories can be implemented to facilitate efficient pipelining.

Figure 1:
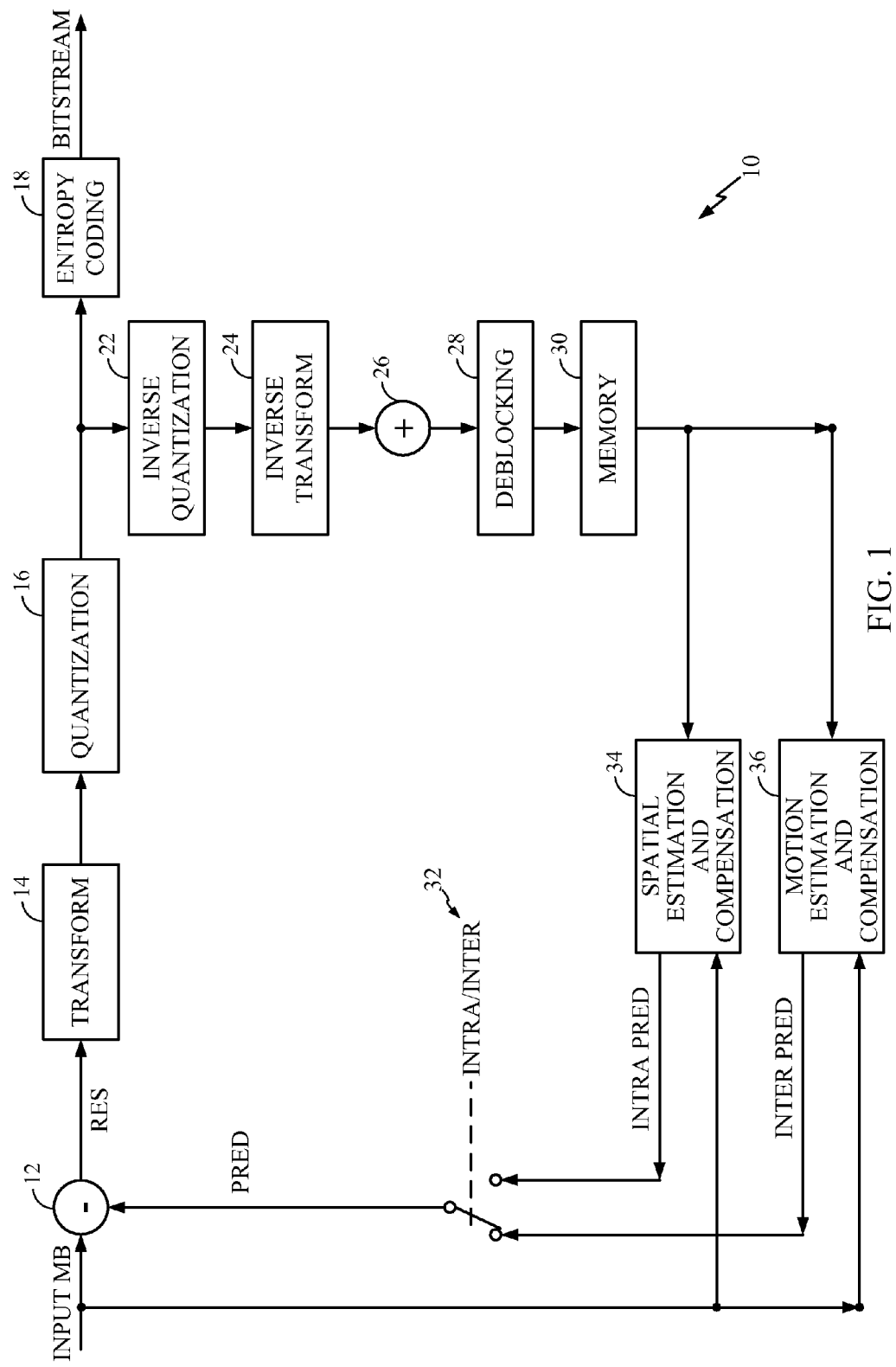
FIG. 1 is a block diagram illustrating an exemplary video coder that of a video coding device that may implement the techniques of this disclosure.

FIG. 1 is a block diagram illustrating an exemplary video coder 10 of a video coding device that may implement the techniques of this disclosure. Indeed, a wide variety of devices may implement a video coder that could benefit from the teaching of this disclosure. As examples, video coder 10 may be used in a digital television, a digital direct broadcast system, a wireless communication device (e.g., a handset), a personal digital assistant (PDA), a laptop computer, a desktop computer, a digital camera, a digital recording device, a cellular or satellite radio telephone, a video game counsel, a handheld gaming device, and the like. Broadcast networks may use video coding to facilitate the broadcast of one or more channels of multimedia (audio-video) sequences to wireless subscriber devices. Video coding is also used to support video telephony (VT) applications, such as video conferencing by cellular radio telephones, as well as a variety of other applications.

As shown in FIG. 1, video coder 10 receives an input macroblocks (MBs). The term "macroblock" is often used to define discrete blocks of a video frame that are compared to a search space and coded. The macroblocks may also be further sub-divided into partitions or sub-partitions. The ITU H.264 standard supports 16 by 16 macroblocks, 16 by 8 partitions, 8 by 16 partitions, 8 by 8 partitions, 8 by 4 sub-partitions, 4 by 8 sub-partitions and 4 by 4 sub-partitions. Other standards may support differently sized blocks, macroblocks, partitions and/or sub-partitions. In any case, although the term "macroblock" may be used to describe aspects of this disclosure, the techniques described herein may be useful in coding any sized block of video data, including macroblocks, partitions, sub-partitions or other video block sizes.

As shown in FIG. 1, for each input MB, a predictive block (labeled "Pred" in FIG. 1) is generated. The predictive block is sometimes referred to as the best match. The predictive block is subtracted via unit 12 from the input MB to generate a residual (labeled "Res" in FIG. 1). The residual comprises a block of data indicative to the differences between the input MB and the predictive block used to code the input MB. The predictive block may be identified by a motion vector (or an intra vector for intra coding). For intra coding, the predictive block is located within the same frame as the input MB. For inter coding, the predictive block is located within a different frame as the input MB. The motion vector (or an intra vector for intra coding) identifies the predictive block used in the coding. Inter coding can be predictive (P), which means that the predictive block is based on a previous frame, or bi-directional (B), which means that the predictive block is based on a previous or subsequent frame of a video sequence.

Upon creating residual (Res), transformation and quantization is performed on the residual. Transform and quantization units 14 and 16 perform the transformation and quantization respectively. Entropy coding may also be performed to generate an output bitstream. Entropy coding unit 18 performs the entropy coding, which may achieve further compression. Entropy coding may include assigning codes to sets of bits, and matching code lengths with probabilities. Various types of entropy coding are well known, and common in video coding.

In the predictive loop of video coder 10, inverse quantization unit 22 and inverse transform unit 24 perform inverse quantization and inverse transformation on the residual to essentially reverse the transformation and quantization performed by units 12 and 14. The predictive block is added back to the reconstructed residual by adder unit 26. The essentially recreates the input MB in the predictive loop. The edges of the reconstructed MB may be filtered by deblocking unit 28 and stored in memory 30.

Quantization, in principle, involves reducing the dynamic range of the transformed signal. Reduction of dynamic range impacts the number of bits (rate) generated by entropy coding. This also introduces loss in the residual, which can cause the original MB and a reconstructed MB to be slightly different. These differences are normally referred to as quantization error or distortion. The strength of quantization is determined by a quantization parameter. Larger quantization parameters cause higher distortion, but can lower the coding rate.

The prediction loop may be an intra prediction loop or an inter prediction loop. MPEG-4 and ITU H.263 typically support only inter prediction. ITU H.264 supports both intra and inter prediction. In video coder 10 of FIG. 1, a control signal 32 may select whether the loop is intra predictive or inter predictive. The techniques of this disclosure, however, could also work in systems that support only intra coding or inter coding.

In intra prediction, unit 34 performs spatial estimation and spatial compensation. In this case, unit 34 compares the reconstructed MB to neighboring macroblocks within the same video frame to generate an intra predictor block. The intra predictor block is essentially the best match to the reconstructed MB, which will result in good compression in the residual. Intra predication can help to reduce spatial redundancy.

In inter prediction, unit 36 performs motion estimation and motion compensation. Motion estimation compares the reconstructed MB to blocks of previous or future frames to generate an inter predictor. The inter predictor is the best match to the reconstructed MB, but unlike an intra predictor, the inter predictor comes from a different video frame or frames. Inter prediction can help reduce temporal redundancy. Typically, exploitation of temporal redundancy can have a larger impact in compression of a video sequence than exploitation of spatial redundancy. That is to say, inter coding of MBs usually achieves better compression than intra coding.

The techniques of this disclosure generally concern transformations, such as forward discrete cosine transformations. The techniques may be implemented during the motion estimation process, although this disclosure is not limited in this respect. For purposes of description, this disclosure will describe the techniques as being performed during motion estimation, but these techniques or similar techniques may also be used in other contexts where transformations are performed.

Motion estimation is a computationally intensive process that can be performed by a video coder. The high number of computations may be due to a large number of potential predictors that can be considered in motion estimation. Practically, motion estimation usually involves searching for the inter predictor in a search space that comprises a subset of one or more previous frames (or subsequent frames). Candidates from the search space may be examined on the basis of a cost function or metric, which is usually defined by performing difference computations, such as sum of absolute difference (SAD), sum of squared difference (SSD), sum of absolute transformed difference (SATD), or sum of squared transformed difference (SSTD). Once the metric is calculated for all the candidates in the search space, the candidate that minimizes the metric can be chosen as the inter predictor. Hence, the main factors affecting motion estimation may be the size of the search space, the search methodology, and various cost functions. Cost functions essentially quantify the redundancy between the original block of the current frame and a candidate block of the search area. The redundancy may be quantified in terms of accurate rate and distortion.

Figure 2:
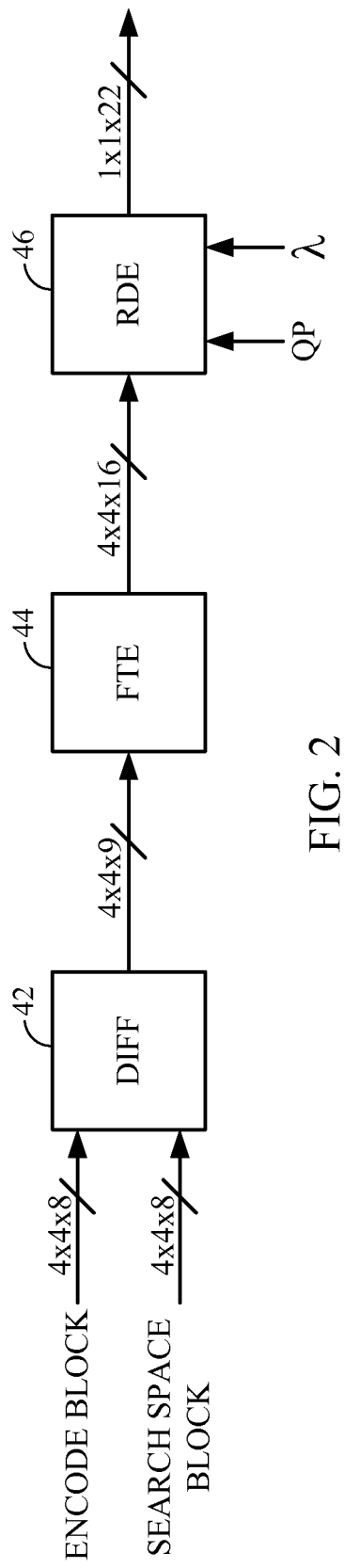
FIGS. 2 and 3 are block diagrams illustrating components that may implement part of a motion estimation process that includes transformations.

FIG. 2 shows a transform-based metric framework. The blocks shown in FIG. 2 may comprise functions performed by a motion estimator (such as unit 36 shown in FIG. 1). Exemplary bit lengths are illustrated in FIG. 2, although the techniques of this disclosure are not limited to any specific bit lengths. Again, motion estimation involves comparing a block to be encoded against multiple candidates within a search space to find the one block within the search space that best matches to the block to be encoded. In accordance with this disclosure, the best match may be defined in a rate and distortion sense.

To accomplish motion estimation, the residual energy is analyzed between the block to be encoded and a given search space block. Each residual candidate is obtained through a process of subtracting the corresponding pixels of the block to be encoded from the pixels of a respective search space block. This is what the difference (Diff) module 42 accomplishes in FIG. 2, e.g., via SAD, SSD, SATD or SSTD techniques. The residual block is then transformed into the frequency domain using forward transform engine (FTE) 44, which may perform forward discrete cosine transformations. The transformed-residual block can then be analyzed for its rate and distortion properties. In particular, rate distortion estimation (RDE) module 46 essentially estimates the rate (R) and distortion (D) that will result for this given search space block at a given quantization parameter, QP. RDE module 46 then combines R and D based on Lagrangian principles into a single cost metric ($=D+\lambda R$), which may be referred to as a rate-distortion metric insofar as the metric depends at least in part on R and D. The costs for all candidate search space blocks may be compared and whichever results in the minimum cost is chosen for the coding.

It should be noted that the cost metric calculated above corresponds to the block being coded and search space blocks that are of size 4 by 4 pixels. For block sizes larger than 4 by 4 pixels, multiple 4 by 4 pixel blocks may be used to span the larger block. In this case, the cost for the larger block be calculated by accumulating the cost metrics for all 4 by 4 unit blocks that span the larger block. The description below focuses on a block size of 4 by 4 pixels, although the techniques could apply to other sized blocks.

Forward transform engine (FTE) 44 is generally a fundamental module of any transform-based metric calculation. Due to the linear nature of the transformation, the stages of difference module 42 and FTE 44 can be switched. In accordance with this disclosure, switching the order of difference module 42 and FTE 44 can allow for computational savings during the transformations. The notation on the input and output of the blocks depicted is (column) by (row) by (number of bits used to represent value) of input.

Figure 3:
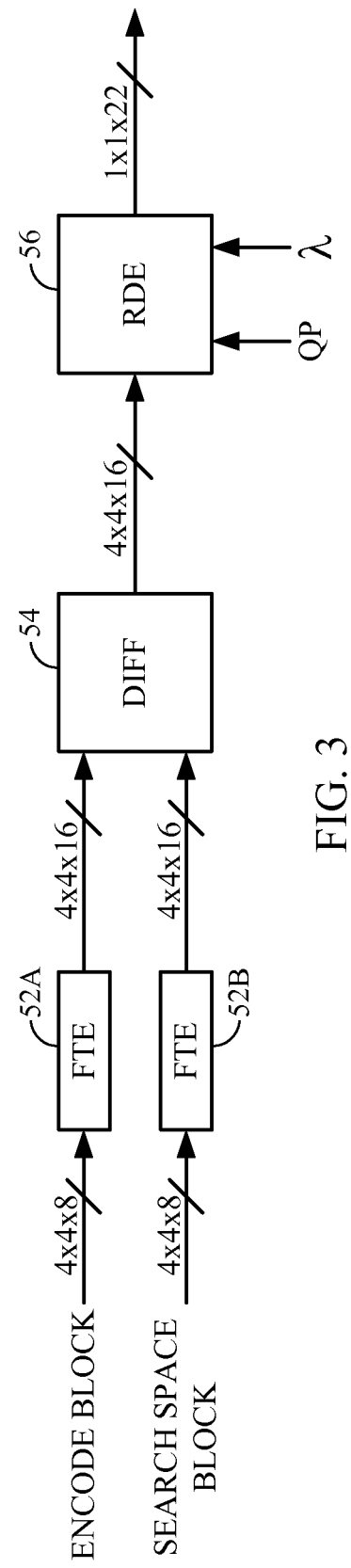

FIG. 3 shows an alternative to FIG. 2 in which the order of difference module 42 and FTE 44 of FIG. 2 is switched. The components of FIG. 3 form part of a motion estimator unit. Bit lengths are illustrated for exemplary purposes, although other bit lengths could be used. In FIG. 3 two different FTEs 52A and 52B transform the block to be encoded ("encode block") and the search space block being considered, e.g., via integer transformations or forward discrete cosine transformations. In this case, difference computations are performed by difference unit 54 after the transformations. RDE module 56 then estimates the rate (R) and distortion (D) that will result for this given search space block at a given quantization parameter, QP. RDE module 56 may combine R and D based on Lagrangian principles into a single cost (=D+λR). The costs for all candidate search space blocks can then be compared in the motion estimation unit (e.g., unit 36 of FIG. 1), and whichever candidate results in the minimum cost can be chosen for the coding.

The basic problem of motion estimation is to find the "best match" for the block to be encoded (the encode block,e) from a search space (s). Encode block (e) and search space (s) may be defined as:

$$e = \begin{bmatrix} e_{00} & e_{01} & e_{02} & e_{03} \\ e_{10} & e_{11} & e_{12} & e_{13} \\ e_{20} & e_{21} & e_{22} & e_{23} \\ e_{30} & e_{31} & e_{32} & e_{33} \end{bmatrix} s = \begin{bmatrix} s_{00} & s_{01} & s_{02} & s_{03} & s_{04} \\ s_{10} & s_{11} & s_{12} & s_{13} & s_{14} \\ s_{20} & s_{21} & s_{22} & s_{23} & s_{24} \\ s_{30} & s_{31} & s_{32} & s_{33} & s_{34} \\ s_{40} & s_{41} & s_{42} & s_{43} & s_{44} \end{bmatrix} \quad (1)$$

As can be seen, e may be matched against four search points in s, which can be $$s = \begin{bmatrix} s(0,0) & s(0,1) \\ s(1,0) & s(1,1) \end{bmatrix} \quad (2)$$

where $$s(0,0) = \begin{bmatrix} s_{00} & s_{01} & s_{02} & s_{03} \\ s_{10} & s_{11} & s_{12} & s_{13} \\ s_{20} & s_{21} & s_{22} & s_{23} \\ s_{30} & s_{31} & s_{32} & s_{33} \end{bmatrix} \quad (3)$$

-continued $$s(0,1) = \begin{bmatrix} s_{01} & s_{02} & s_{03} & s_{04} \\ s_{11} & s_{12} & s_{13} & s_{14} \\ s_{21} & s_{22} & s_{23} & s_{24} \\ s_{31} & s_{32} & s_{33} & s_{34} \end{bmatrix} \quad (4)$$

$$s(1,0) = \begin{bmatrix} s_{10} & s_{11} & s_{12} & s_{13} \\ s_{20} & s_{21} & s_{22} & s_{23} \\ s_{30} & s_{31} & s_{32} & s_{33} \\ s_{40} & s_{41} & s_{42} & s_{43} \end{bmatrix} \quad (5)$$

$$s(1,1) = \begin{bmatrix} s_{11} & s_{12} & s_{13} & s_{14} \\ s_{21} & s_{22} & s_{23} & s_{24} \\ s_{31} & s_{32} & s_{33} & s_{34} \\ s_{41} & s_{42} & s_{43} & s_{44} \end{bmatrix} \quad (6)$$

Figure 11:
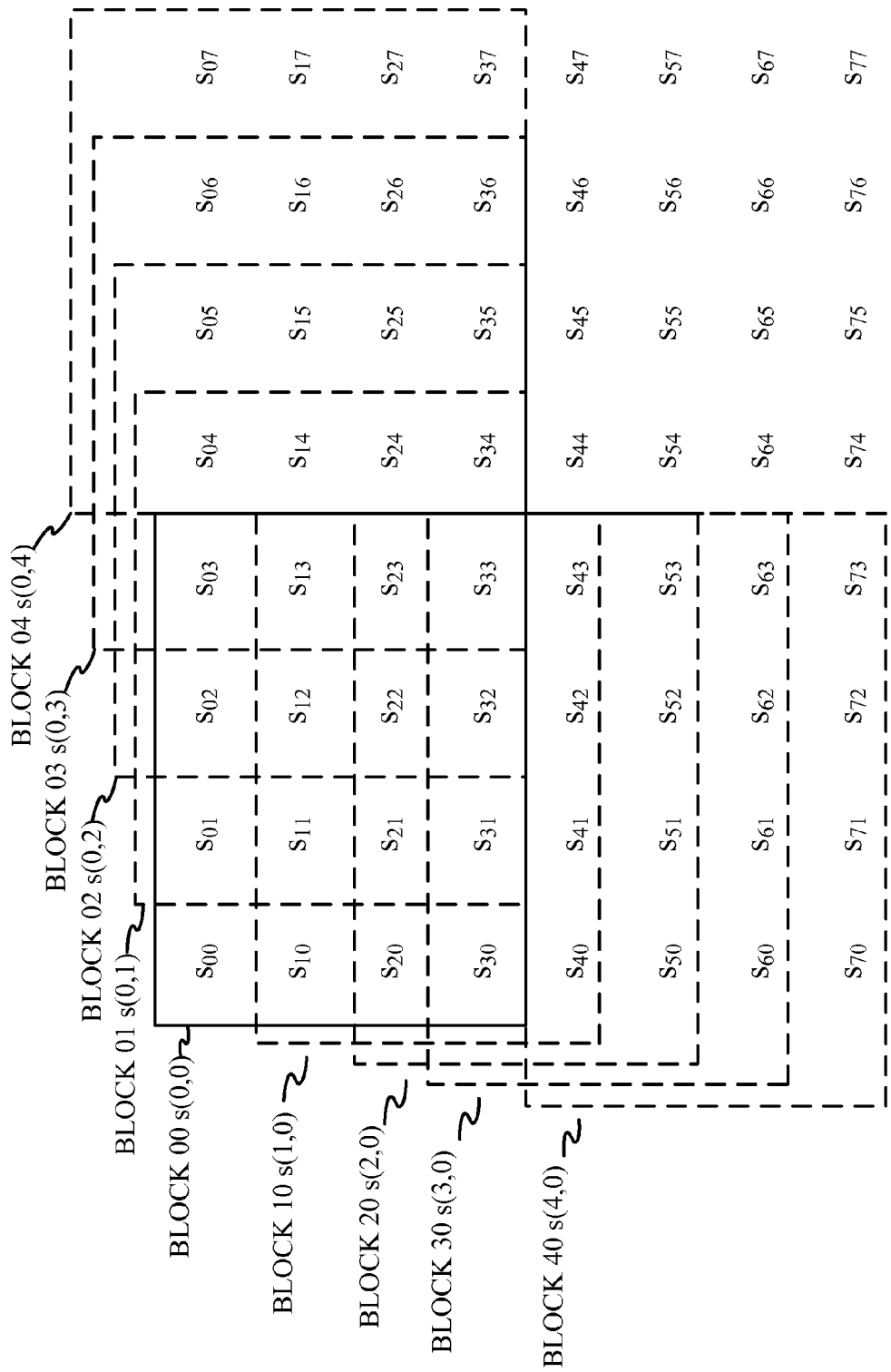
FIG. 11 is a conceptual diagram of blocks within a search space, illustrating input blocks into a vertical engine.

Note that a (search) point, e.g., s(0,0), s(0,1), s(1,0) or s(1,1) is depicted as a block of equal horizontal and vertical dimensions. s(0,0) may be referred to as block 00, s(0,1) may be referred to as block 01, s(1,0) may be referred to as block 10, and s(1,1) may be referred to as block 11. A search point may also depict a block of unequal horizontal and vertical dimensions. FIG. 11 shows a 8×8 search area with some defined search points and blocks shown for illustrative purposes consistent with this example. In order to find the best match for e in s, the residual blocks r(x, y) can be calculated as:

$$r(x,y) = e - s(x,y) \, x, y \in 0,1 \quad (7)$$

The residual block r(x, y) is then transformed into the spatial frequency domain via transformation matrix, $$\begin{bmatrix} 1 & 1 & 1 & 1 \\ 2 & 1 & -1 & -2 \\ 1 & -1 & -1 & 1 \\ 1 & -2 & 2 & -1 \end{bmatrix}.$$

$$\begin{bmatrix} R'_{0v}(x,y) \\ R'_{1v}(x,y) \\ R'_{2v}(x,y) \\ R'_{3v}(x,y) \end{bmatrix} = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} r_{0v}(x,y) \\ r_{1v}(x,y) \\ r_{2v}(x,y) \\ r_{3v}(x,y) \end{bmatrix} \, v \in 0,1,2,3 \quad (8)$$

$$\begin{bmatrix} R_{h0}(x,y) \\ R_{h1}(x,y) \\ R_{h2}(x,y) \\ R_{h3}(x,y) \end{bmatrix} = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} R'_{h0}(x,y) \\ R'_{h1}(x,y) \\ R'_{h2}(x,y) \\ R'_{h3}(x,y) \end{bmatrix} \, h \in 0,1,2,3 \quad (9)$$

Figure 4:
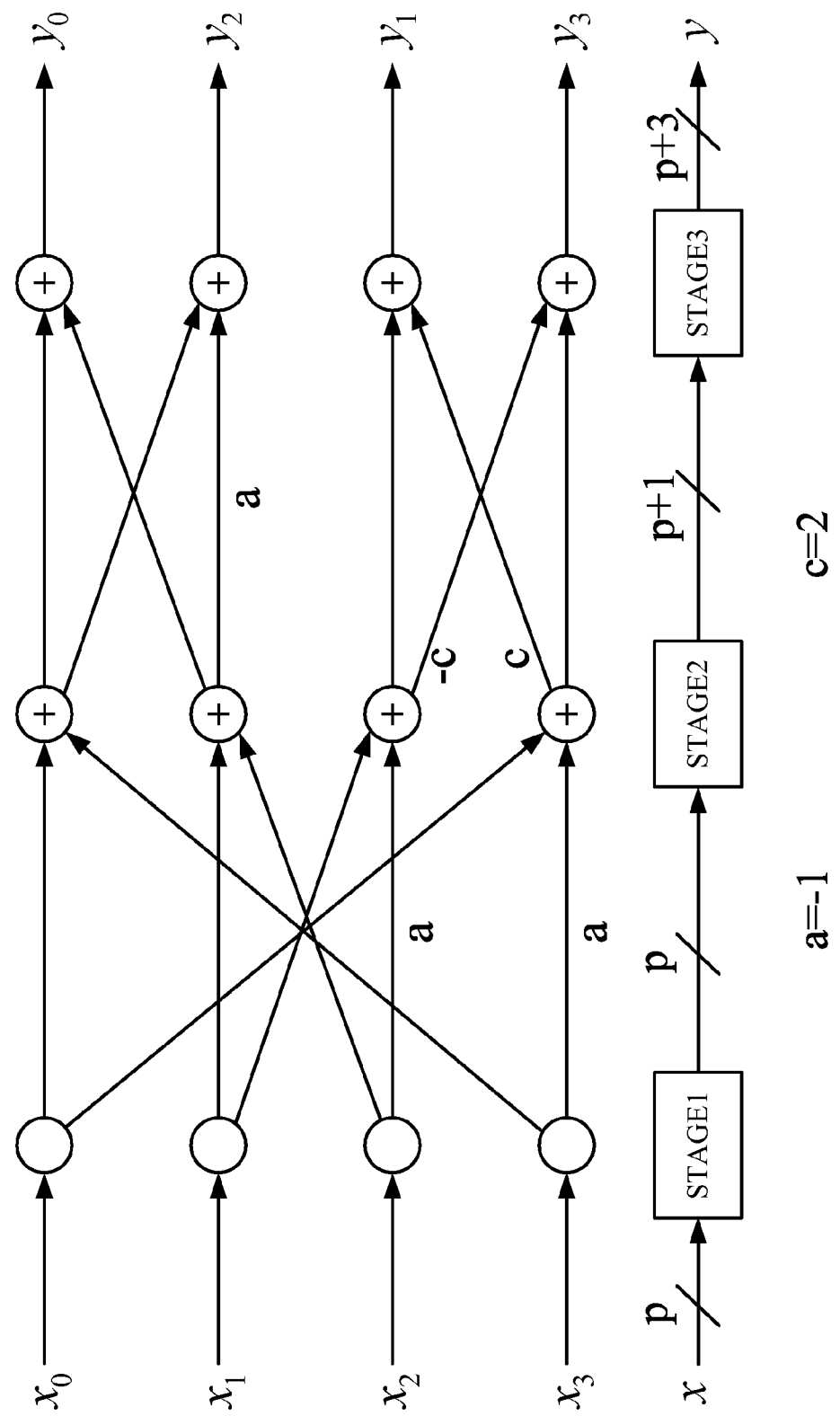
FIG. 4 is a diagram illustrating a butterfly implementation for performing one-dimensional transformations.

In equation 8, variable v denotes vertical columns, and in equation 9, variable h denotes horizontal rows. The transformation matrix is comprised of integers, in some contexts it is known as an integer transform, and in others it is referred to as a discrete cosine transform. Discrete cosine transforms (DCTs) may be either integer transforms or "real number" transforms. A person having ordinary skill in the art will recognize that the transformation matrix may be formed by integers or real numbers. It can be noted that a 4-point one-dimensional (1-D) transform may be employed to generate spatial frequency domain components of a video block. The 4-point 1-D transform may first be applied to all columns to generate first pass intermediate results and then a 4-point 1D transform may be applied in a second pass to all rows of the intermediate results. A "butterfly implementation" of a 1-D transform is shown in FIG. 4, which uses a set of adders to combine the inputs in different ways to generate different outputs. A brute force method would use eight separate 1-D transforms for the calculation of R(0,0), R(0,1), R(1,0) or R(1,1). In the brute force method, each search point is treated independently and there is no re-using of intermediate results, R'(0,0), R'(0,1), R'(1,0), R'(1,1). For high definition television (HDTV), if only one vertical and one horizontal engine are used to search the entire frame, the throughput may be too slow to facilitate real-time presentation of video frames. Therefore, for HDTV or other applications, to speed up the search, multiple vertical and horizontal engines can be used in parallel, as described in greater detail below.

As shown in FIG. 4, one 1-D four input transformation may be viewed as having several stages. Variables $x_0$, $x_1$, $x_2$ and $x_3$ represent inputs to the transformation, and $y_0$, $y_1$, $y_2$ and $y_3$ represent the four transformed outputs of the transformation. The values "a" and "c" are multiplicative constants. Thus, an arrow with a "c" above it means the output of that arrow is the result of multiplying the input value (the left side of the arrow) with the value "c". The value "p" represents the wordlength, i.e., the number of bits that enter the various stages.

If a modified framework is used, as shown in FIG. 3, intermediate results of the transformations may be reused. In particular, the two dimensional transformed R(x, y) can be obtained as follows, in contrast to equations (7), (8) & (9).

$$R(x, y) = E - S(x, y) \quad x, y \in 0, 1 \tag{10}$$

where $$\begin{bmatrix} S'_{0v}(x, y) \\ S'_{1v}(x, y) \\ S'_{2v}(x, y) \\ S'_{3v}(x, y) \end{bmatrix} = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} s_{0v}(x, y) \\ s_{1v}(x, y) \\ s_{2v}(x, y) \\ s_{3v}(x, y) \end{bmatrix} \quad v \in 0, 1, 2, 3 \tag{11}$$

$$\begin{bmatrix} S_{h0}(x, y) \\ S_{h1}(x, y) \\ S_{h2}(x, y) \\ S_{h3}(x, y) \end{bmatrix} = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} S'_{h0}(x, y) \\ S'_{h1}(x, y) \\ S'_{h2}(x, y) \\ S'_{h3}(x, y) \end{bmatrix} \quad h \in 0, 1, 2, 3 \tag{12}$$

$$\begin{bmatrix} E'_{0v} \\ E'_{1v} \\ E'_{2v} \\ E'_{3v} \end{bmatrix} = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} e_{0v} \\ e_{1v} \\ e_{2v} \\ e_{3v} \end{bmatrix} \quad v \in 0, 1, 2, 3 \tag{13}$$

$$\begin{bmatrix} E_{h0} \\ E_{h1} \\ E_{h2} \\ E_{h3} \end{bmatrix} = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} E'_{h0} \\ E'_{h1} \\ E'_{h2} \\ E'_{h3} \end{bmatrix} \quad h \in 0, 1, 2, 3 \tag{14}$$

Thus, the transformation can be changed from a transformation of r(x,y) to a transformation of s(x,y). This allows the column overlap of s(0,0) (equation 3) and s(0,1) (equation 4) to be exploited, and the column overlap of s(1,0) (equation 5) and s(1,1) (equation 6) to be exploited. First pass intermediate results (i.e., results associated with the columns) of S'(0,0) may be re-used to avoid duplicate computations of first pass intermediate results (i.e., results associated with the columns) of S'(0,1). Similarly, first pass intermediate results (i.e., results associated with the columns) of S'(1,0) may be re-used to avoid duplicate computations of first pass intermediate results (i.e., results associated with the columns) of S'(1,1). This re-use (also called sharing) of intermediate results is explained in greater detail below.

To illustrate the re-use (e.g., sharing) concept, consider as an example, that two dimensional transformed s(0,0) may be calculated as:

$$\begin{bmatrix} S'_{0v}(0, 0) \\ S'_{1v}(0, 0) \\ S'_{2v}(0, 0) \\ S'_{3v}(0, 0) \end{bmatrix} = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} s_{0v}(0, 0) \\ s_{1v}(0, 0) \\ s_{2v}(0, 0) \\ s_{3v}(0, 0) \end{bmatrix} \quad v \in 0, 1, 2, 3 \tag{15}$$

$$\begin{bmatrix} S_{h0}(0, 0) \\ S_{h1}(0, 0) \\ S_{h2}(0, 0) \\ S_{h3}(0, 0) \end{bmatrix} = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} S'_{h0}(0, 0) \\ S'_{h1}(0, 0) \\ S'_{h2}(0, 0) \\ S'_{h3}(0, 0) \end{bmatrix} \quad h \in 0, 1, 2, 3 \tag{16}$$

Furthermore, S(0, 1) may be calculated as:

$$\begin{bmatrix} S'_{0v}(0, 1) \\ S'_{1v}(0, 1) \\ S'_{2v}(0, 1) \\ S'_{3v}(0, 1) \end{bmatrix} = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} s_{0v}(0, 1) \\ s_{1v}(0, 1) \\ s_{2v}(0, 1) \\ s_{3v}(0, 1) \end{bmatrix} \quad v \in 0, 1, 2, 3 \tag{17}$$

$$\begin{bmatrix} S_{h0}(0, 1) \\ S_{h1}(0, 1) \\ S_{h2}(0, 1) \\ S_{h3}(0, 1) \end{bmatrix} = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} S'_{h0}(0, 1) \\ S'_{h1}(0, 1) \\ S'_{h2}(0, 1) \\ S'_{h3}(0, 1) \end{bmatrix} \quad h \in 0, 1, 2, 3 \tag{18}$$

It can be noted that from equations (3) & (4):

$$s_{v(n)}(0,0) = s_{v(n-1)}(0,1) \quad v \in 0,1,2,3 \; n \in 1,2,3 \tag{19}$$

Hence, it follows $$S'_{v(n)}(0,0) = S'_{v(n-1)}(0,1) \quad v \in 0,1,2,3 \; n \in 1,2,3 \tag{20}$$

This means for n ∈ 1,2,3 the first pass intermediate results associated with S'(0,0) can be re-used to calculate the first pass intermediate results associated with S'(0,1). It may be noted that re-use may eliminate three out of eight 1-D column transforms otherwise needed for the calculation of S'(0,1). Therefore, savings of up to 37.5 percent of 1-D transforms may be achieved during the first pass. It should be pointed out that video blocks may also be processed by overlapping the rows of s(0,0) with the rows of s(1,0), in which case 1-D row transforms would be applied to the rows on a first pass, prior to a second pass of 1-D column transforms on the columns resulting from the first pass. In other words, the techniques of this disclosure can apply regardless of the order of the horizontal transforms and the vertical transforms.

In general, to search for a best match of a 4×4 block in a N×M search space, there are total (N−3)×(M−3) search points. Where N represents the total pixel count in horizontal direction and M represents the total pixel count in vertical direction. In order to ensure the search for best match tasks be able to finish in time for real time video coding, multiple 1D engines can be designed and run at the same time. Assuming "j+1" units ((0≤j≤N−3) of horizontal engines are used in parallel to accelerate the searching, and if vertical transformed data is shared efficiently, only "k+1" units of vertical engines are needed. Where k=Integer of (j+3)/4. In designing a video coding architecture, power consumption and silicon area are important trade off factors for the performance of transformation engines.

Figure 5:
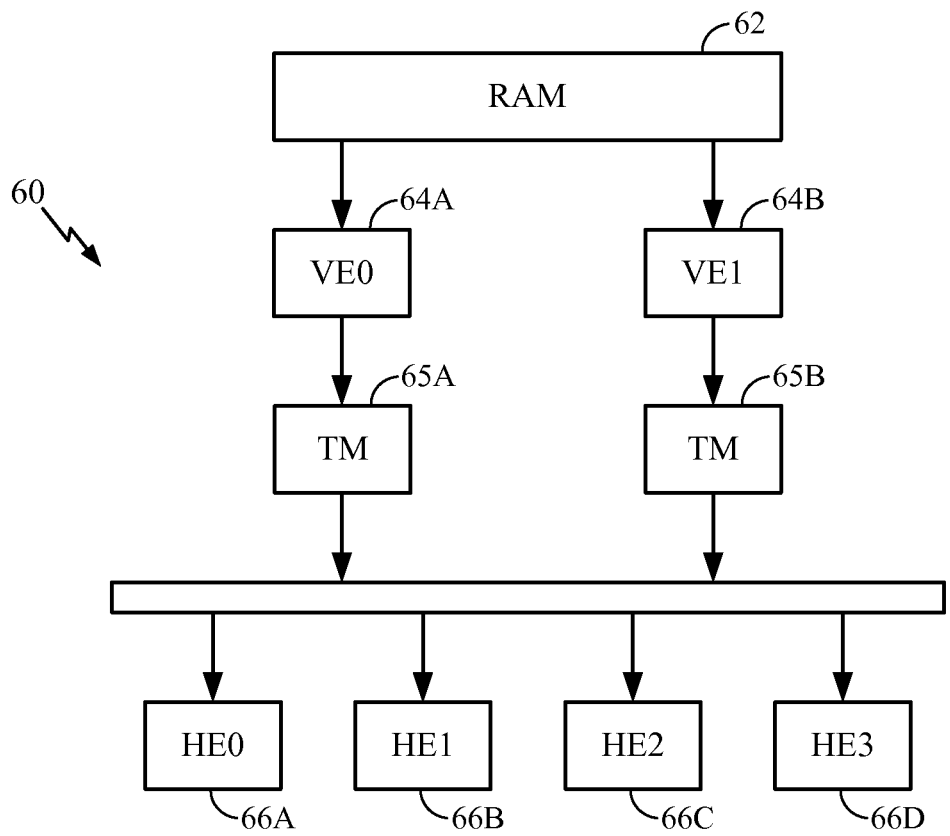
FIG. 5 is a block diagram illustrating an architecture that may use the computational sharing techniques for transformations as described herein.

FIG. 5 is a block diagram illustrating an architecture that may use the computational re-using techniques for transformations as well as pipelining techniques described herein. The architecture example shown in FIG. 5 may be used to realize FTE 52B. Here, four horizontal engines are used (j=3), and thus, to have efficient data sharing in this design architecture, two vertical engines may be used (k=2). As shown in FIG. 5, an FTE 60 includes random access memory (RAM) 62, two vertical engines (VE(0) 64A and VE(1) 64B), two transpose memories TM 65A an TM 65B, and four horizontal engines (HE(0) 66A, HE(1) 66B, HE(2) 66C and HE(3) 66D)

FTE 60 may implement a 4 by 4 forward transform in both vertical and horizontal directions. Typically, it does not matter whether the vertical transformations or horizontal transformations are performed first. That is to say, the sequence of the transformations (vertical and horizontal) could be switched in other implementations. Therefore, in other implementations, the horizontal transformations may be performed prior to the vertical transformations. In FIG. 5, a vertical transformation is the first transformation operation, followed by the horizontal transformation.

As shown in FIG. 5, the architecture makes use of four horizontal engines 66A-66D and two vertical engines 64A and 64B. RAM 62 may contain the search space pixels that are supplied to vertical engines 64A and 64B. Vertical engines 64A and 64B are connected to transpose memories 65A and 65B, and transpose memories 65A and 65B supply data to horizontal engines 66A-66D. Horizontal engines 66A-66D can be configured in the form of a 1D systolic array. In some examples, described in greater detail below, the horizontal and vertical engines may be designed based on a 4×4 transformation. However, the transformation size could be any size (e.g., N×N), and different sized transformations could change the hardware engine designs, while still realizing the advantages associated with reuse of intermediate computations.

As noted above, the technique described herein may be able to achieve a reduction of up to 37.5 percent in terms of number of 1D transforms that are performed. However, the architecture shown in FIG. 5 may achieve a reduction of only 25 percent. The amount of computational reductions can improve as the number of horizontal engines increase because more sharing can take place. In order to sustain sixteen horizontal engines, five vertical engines may be needed. In this case, the amount of computational reductions may become 1−[(5+16)/(16+16)]=34.4%. In general for N horizontal engines, 1+Ceil((N−1)/4) vertical engines may be needed. Ceil( ) rounds towards positive infinity (+∞). The generalized formula for the computational reduction may be given by:

1−[(Number of Vertical Engines+Number of Horizontal Engines)/(Number of Horizontal Engines+Number of Horizontal Engines)]

Figure 6:
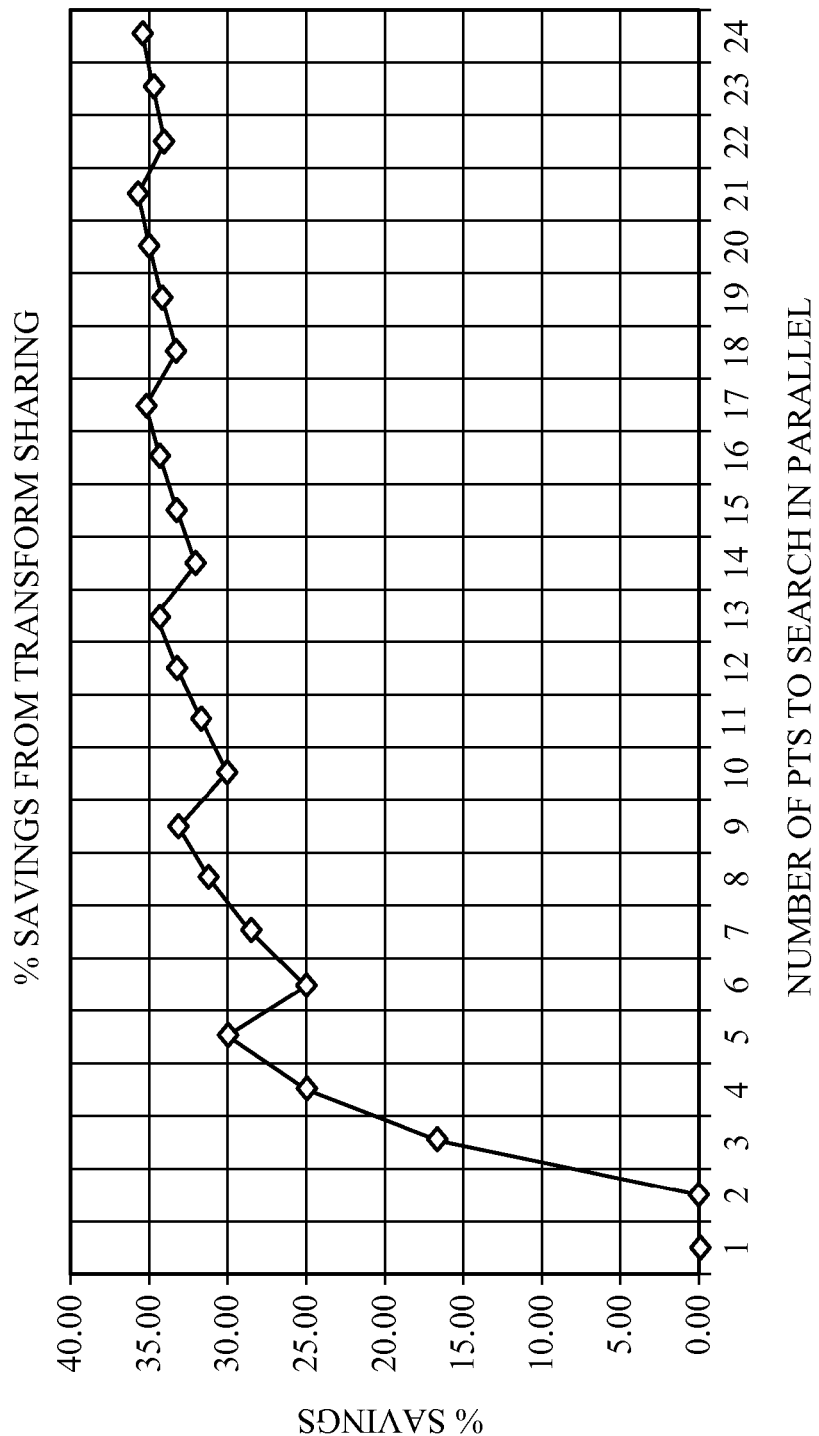
FIG. 6 is a graph illustrating computational savings that may be achieved in accordance with this disclosure.

FIG. 6 is a graph illustrating computational savings that may be achieved in accordance with this disclosure. In particular, FIG. 6 graphs the percentage of computational savings that can be achieved (on the y axis) based on the number of points that are searched in parallel (on the x axis). In general, the number of search points may equal the number of horizontal engines (assuming a vertical transform is performed first and then a horizontal transform). As an example, 16 horizontal engines should cover 16 search points. Hence at the value 16 on the x-axis of FIG. 6, this corresponds to 34.4% savings on the graph.

Figure 7:
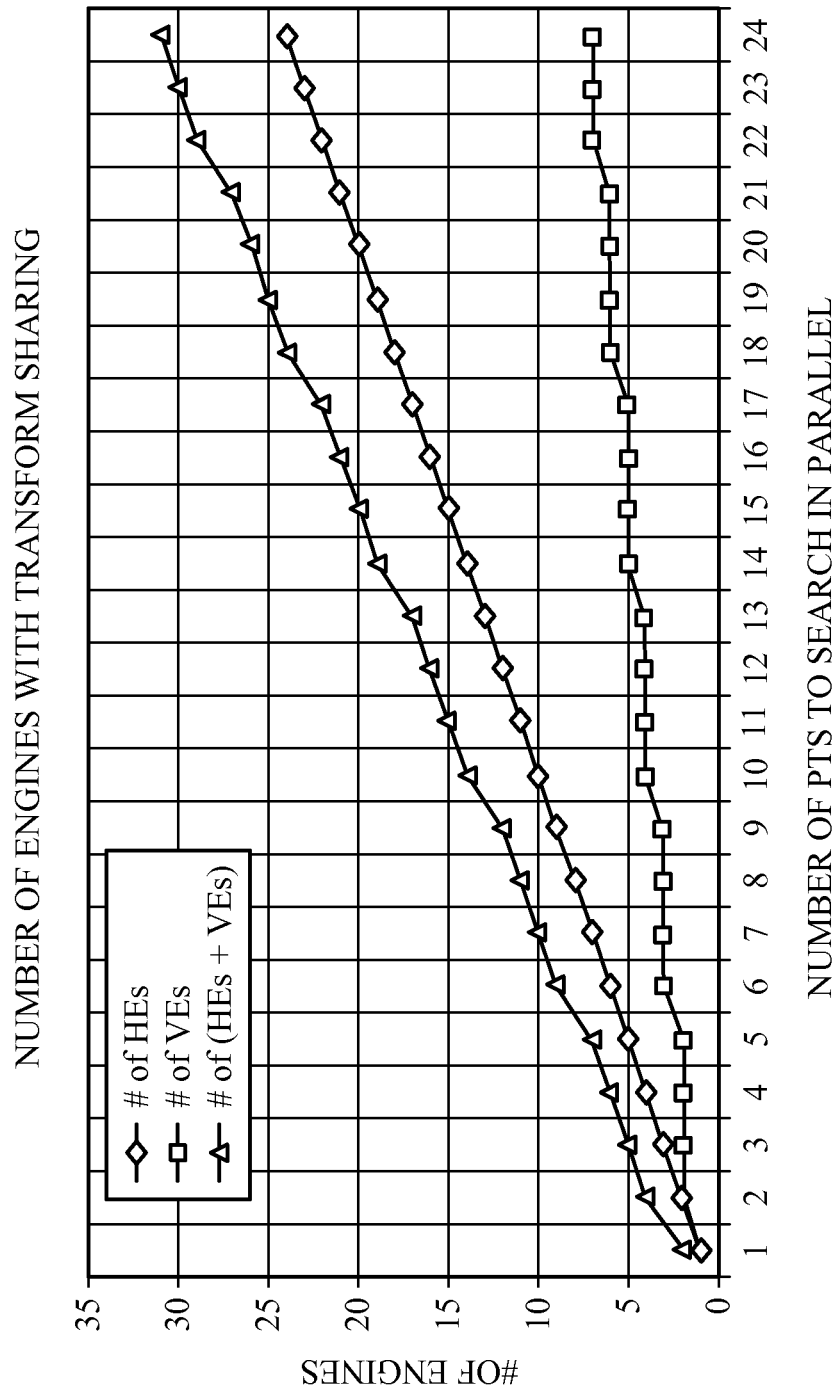
FIG. 7 is a graph illustrating a number of transformation engines as a function of a number of search points that may be searched in parallel.

FIG. 7 is a graph illustrating a number of transformation engines as a function of a number of search points that may be searched in parallel. FIG. 7 graphs the number of horizontal engines (on the y axis), the number of vertical engines (on the y axis), and the combined number of horizontal and vertical engines (on the y axis) for different numbers of search points that may be searched in parallel (on the x axis).

Again, multiple horizontal engines can be used in the FTE to improve the transformation throughput and the data sharing. In order to ensure that the FTE engine can facilitate efficient data sharing and low power consumption in a relatively small area, the vertical and horizontal engines of the FTE may be designed differently. In particular, to save clock power, the majority of data registers in the engines are designed by clocking at one half or one quarter of the pixel clock rate. Table 1, Table 2 and Table 3 (below) illustrate a clocking scheme that can be used.

Figure 8:
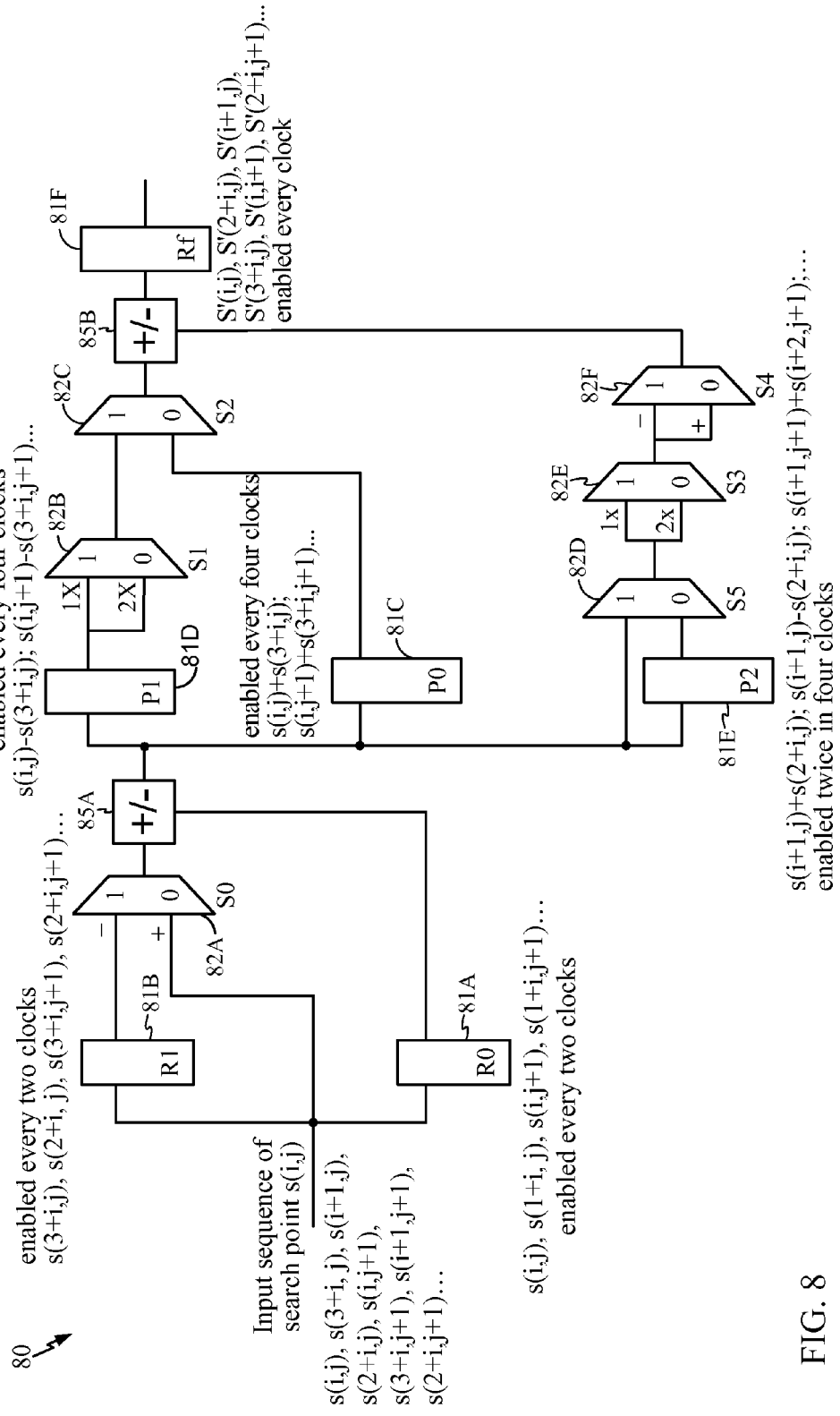
FIG. 8 is a block diagram illustrating an exemplary vertical engine.

FIG. 8 illustrates an exemplary vertical transformation engine 80 (also referred to as a vertical engine). Vertical engine 80 includes various registers R0 (81A), R1 (81B), P0 (81C), P1 (81D), P2 (81E) and Rf (81F), multiplexers 82A, 82B 82C, 82D, 82E and 82F and adders 85A and 85B. Vertical engine 80 receives pixel data directly from the RAM 62 (FIG. 5). Techniques may be implemented with vertical engine 80, in which vertical engine 80 re-sequences input pixel data, re-arranges internal data paths, and latches broadcasted pixel input data to designated registers.

Table 1 shows exemplary data flow and timing of vertical engine 80 for search point s(0,0) and part of search point s(1,0) which its transform starts at clock cycle sixteen. In particular, Table 1 shows the content of these different registers, given input (I/P) over successive clock cycles. The output (O/P) may correspond to the content of register Rf (81F). Again, a "divided down" clock signal may be used, in which case the equivalent clocking power for vertical engine 80 handles 3 registers for every clock cycle.

In general, for search point s(i,j), the pixel data from the RAM 62 is re-sequenced as follow: s(i, j+l), s(i+3, j+l), s(i+1, j+l), s(i+2, j+l); l ∈0,1,2,3. Register R0 (81A) is enabled at clock 2n cycle to latch pixel data s(i, j+l), s(i+1, j+l) l∈0,1,2,3. Register R1 (81B) latch the input pixel data every two clock cycles. Register R0 (81A) clock is enabled at clock 2n+1 cycle to latch pixel data s(i+3, j+l), s(i+2, j+l) l ∈0,1,2,3. For the registers P0 81C, P1 81D, P2 81E that are used to hold the intermediate transform data, P0 (81C) clock is enabled at cycle 4n+1 to latch s(i,j+l)+s(i+3, j+l), P1 (81D) at cycle 4n+2 latches s(i, j+l)−s(i+3, j+l) and P2 (81E) at cycle 4n+3 latches s(i+1,j+l)+s(i+2, j+l), at cycle 4n+4 latches s(i +1, j+l)−s(i+2, j+l) here n=0, 1, 2 ... l ∈0,1,2,3. Register Rf (81F) is used to hold the final transformation result and it is enabled every clock cycle. For search point s(i,j) the vertically transformed output sequence are S'(i, j+l), S'(i+2, j+l), S'(i+1, j+l), S'(i+3, j+l), l ∈0,1,2,3

TABLE 1

| time | I/P | | R1 | R0 | P0 | P1 | P2 | Vertical O/P |
|---|---|---|---|---|---|---|---|---|
| 0 | s00 | | | | Vertical Engine VE(0) Input and Output Timing Chart | | | |
| 1 | s00 | | | s00 | | | | |
| 1 | s30 | | | s00 | | | | |
| 2 | s30 | | s30 | s00 | s00 + s30 | | | |
| 2 | s10 | | s30 | s00 | s00 + s30 | | | |
| 3 | s10 | | s30 | s10 | s00 + s30 | s00 - s30 | | |
| 3 | s20 | | s30 | s10 | s00 + s30 | s00 - s30 | | |
| 4 | s20 | | s20 | s10 | s00 + s30 | s00 - s30 | s10 + s20 | s00 + s30 + s10 + s20 (S'00) |
| 4 | s01 | | s20 | s10 | s00 + s30 | s00 - s30 | s10 + s20 | s00 + s30 + s10 + s20 (S'00) |
| 5 | s01 | | s20 | s01 | s00 + s30 | s00 - s30 | s10 - s20 | s00 + s30 - s10 - s20 (S'20) |
| 5 | s31 | | s20 | s01 | s00 + s30 | s00 - s30 | s10 - s20 | s00 + s30 - s10 - s20 (S'20) |
| 6 | s31 | | s31 | s01 | s01 + s31 | s00 - s30 | s10 - s20 | 2s00 - 2s30 + s10 - s20 (S'10) |
| 6 | s11 | | s31 | s01 | s01 + s31 | s00 - s30 | s10 - s20 | 2s00 - 2s30 + s10 - s20 (S'10) |
| 7 | s11 | | s31 | s11 | s01 + s31 | s01 - s31 | s10 - s20 | s00 - s30 - 2s10 + 2s20 (S'30) |
| 7 | s21 | | s31 | s11 | s01 + s31 | s01 - s31 | s10 - s20 | s00 - s30 - 2s10 + 2s20 (S'30) |
| 8 | s21 | | s21 | s11 | s01 + s31 | s01 - s31 | s11 + s21 | s01 + s31 + s11 + s21 (S'01) |
| 8 | s02 | | s21 | s11 | s01 + s31 | s01 - s31 | s11 + s21 | s01 + s31 + s11 + s21 (S'01) |
| 9 | s02 | | s21 | s02 | s01 + s31 | s01 - s31 | s11 - s21 | s01 + s31 - s11 - s21 (S'21) |
| 9 | s32 | | s21 | s02 | s01 + s31 | s01 - s31 | s11 - s21 | s01 + s31 - s11 - s21 (S'21) |
| 10 | s32 | | s32 | s02 | s02 + s32 | s01 - s31 | s11 - s21 | 2s01 - 2s31 + s11 - s21 (S'11) |
| 10 | s12 | | s32 | s02 | s02 + s32 | s01 - s31 | s11 - s21 | 2s01 - 2s31 + s11 - s21 (S'11) |
| 11 | s12 | | s32 | s12 | s02 + s32 | s02 - s32 | s11 - s21 | s01 - s31 - 2s11 + 2s21 (S'31) |
| 11 | s22 | | s32 | s12 | s02 + s32 | s02 - s32 | s11 - s21 | s01 - s31 - 2s11 + 2s21 (S'31) |
| 12 | s22 | | s22 | s12 | s02 + s32 | s02 - s32 | s12 + s22 | s02 + s32 + s12 + s22 (S'02) |
| 12 | s03 | | s22 | s12 | s02 + s32 | s02 - s32 | s12 + s22 | s02 + s32 + s12 + s22 (S'02) |
| 13 | s03 | | s22 | s03 | s02 + s32 | s02 - s32 | s12 - s22 | s02 + s32 - s12 - s22 (S'22) |
| 13 | s33 | | s22 | s03 | s02 + s32 | s02 - s32 | s12 - s22 | s02 + s32 - s12 - s22 (S'22) |
| 14 | s33 | | s33 | s03 | s03 + s33 | s02 - s32 | s12 - s22 | 2s02 - 2s32 + s12 - s22 (S'12) |
| 14 | s13 | | s33 | s03 | s03 + s33 | s02 - s32 | s12 - s22 | 2s02 - 2s32 + s12 - s22 (S'12) |
| 15 | s13 | | s33 | s13 | s03 + s33 | s03 - s33 | s12 - s22 | s02 - s32 - 2s12 + 2s22 (S'32) |
| 15 | s23 | | s33 | s13 | s03 + s33 | s03 - s33 | s12 - s22 | s02 - s32 - 2s12 + 2s22 (S'32) |
| 16 | s23 | | s23 | s13 | s03 + s33 | s03 - s33 | s13 + s23 | s03 + s33 + s13 + s23 (S'03) |
| 16 | s10 | | s23 | s13 | s03 + s33 | s03 - s33 | s13 + s23 | s03 + s33 + s13 + s23 (S'03) |
| 17 | s10 | | s23 | s10 | s03 + s33 | s03 - s33 | s13 - s23 | s03 + s33 - s13 - s23 (S'23) |
| 17 | s40 | | s23 | s10 | s03 + s33 | s03 - s33 | s13 - s23 | s03 + s33 - s13 - s23 (S'23) |
| 18 | s40 | | s40 | s10 | s10 + s40 | s03 - s33 | s13 - s23 | 2s03 - 2s33 + s13 - s23 (S'13) |
| 18 | s20 | | s40 | s10 | s10 + s40 | s03 - s33 | s13 - s23 | 2s03 - 2s33 + s13 - s23 (S'13) |
| 19 | s20 | | s40 | s20 | s10 + s40 | s10 - s40 | s13 - s23 | s03 - s33 - 2s13 + 2s23 (S'33) |
| 19 | s30 | | s40 | s20 | s10 + s40 | s10 - s40 | s13 - s23 | s03 - s33 - 2s13 + 2s23 (S'33) |
| 20 | s30 | | s30 | s20 | s10 + s40 | s10 - s40 | s20 + s30 | s10 + s40 + s20 + s30 (S'10) |
| 20 | s11 | | s30 | s20 | s10 + s40 | s10 - s40 | s20 + s30 | s10 + s40 + s20 + s30 (S'10) |
| 21 | s11 | | s30 | s11 | s10 + s40 | s10 - s40 | s20 - s30 | s10 + s40 - s20 - s30 (S'30) |
| 21 | s41 | | s30 | s11 | s10 + s40 | s10 - s40 | s20 - s30 | s10 + s40 - s20 - s30 (S'30) |

In Table 1, the square wave illustrated in the forth column represents the system clock. All data in vertical engine 80 may be registered at the rising edge of this system clock.

Figure 12:
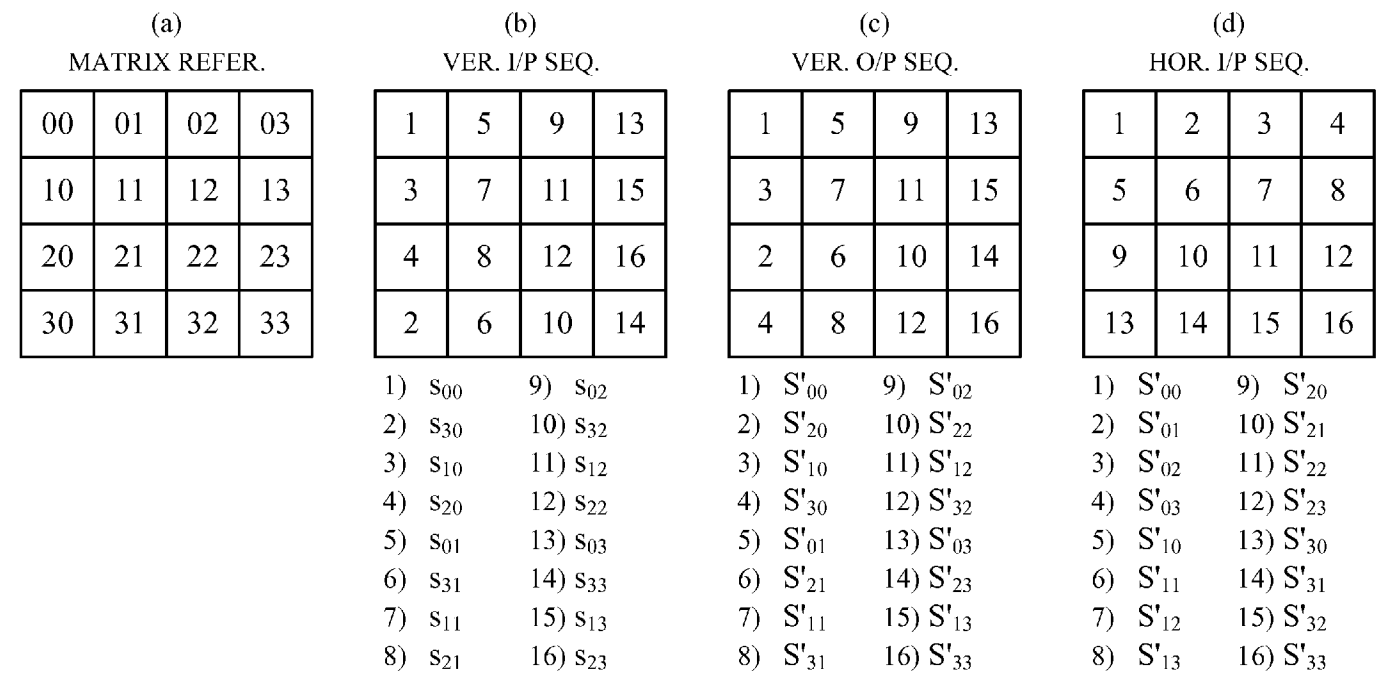
Figure 13:
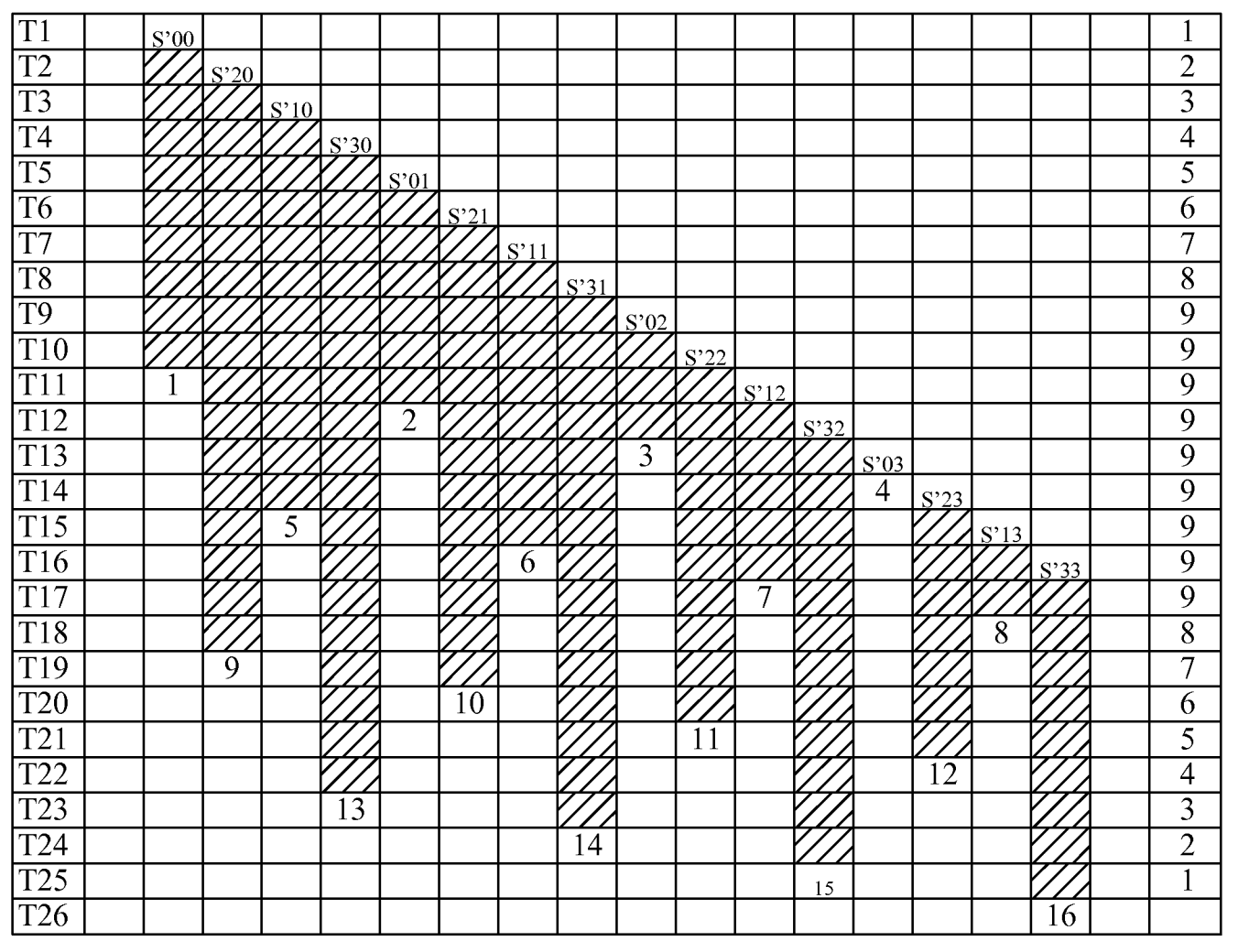

In order for the horizontal engine can share the vertically transformed data efficiently it has to take the 4×4 vertically transformed data in sequential order, there are few different orders to make the efficient data sharing works, the example shown here is just one of them. To minimize the power consumption, it is desirable for the horizontal engine to consume the vertically transformed data immediately. Transpose registers TM 65A, 65B are designed to temporary store and reshuffle the vertical transformed data. FIG. 12 depicts the input and output sequence for vertical and horizontal engines. FIG. 13 depicts the minimum TM registers required to re-sequence the vertical transformed data for horizontal engine.

For efficient processing in horizontal engines (such as engines 66A-66D of FIG. 5), it is desirable to minimize accesses to memory. In addition, it is desirable to have all accessed data processed before it is discarded. To efficiently accommodate these goals, two different types of horizontal engines HE(0) 90 and HE(j) 100 may be used. HE(0) 90 may correspond to horizontal engine 66A (FIG. 5) and HE(j) 100 may correspond to each of engines 66B-66D.

Each horizontal engine takes four strings of data, they are data sequence0, data sequence1, data sequence2 and data sequence3. The sequences are depicted as follow:

Sequence 0: S'(i, j), S'(i+1, j), S'(i+2, j), S'(i+3, j)
Sequence 1: S'(i, j+1), S'(i+1, j+1), S'(i+2, j+1), S'(i+3, j+1)
Sequence 2: S'(i, j+2), S'(i+1, j+2), S'(i+2, j+2), S'(i+3, j+2)
Sequence 3: S'(i, j+3), S'(i+1, j+3), S'(i+2, j+3), S'(i+3, j+3)

S'(i,j) represent the vertically transformed pixel data. For horizontal engine HE(0), all four sequence data are input from the vertical engine VE(0).

For horizontal engine HE(1) 100, its sequence0 and sequence0 input data are from register 91B and 91C data of the HE(0) 90, sequence2 data is from the sharing data output of the 92H of HE(0) 90, and the sequence3 data of the HE(1) 100 is from the vertical engine VE(1) 80 directly.

For horizontal engine HE(2) 100, its sequence0 data input is from HE(0) 90 register 91C, sequence1 data is from the sharing data output of the 92H of HE(0), sequence2 data is from the sharing data output 92H of HE(1) 100, and the sequence3 data of the HE(2) is from the vertical engine VE(1) 80 directly.

For horizontal engine HE(j) 100, where j≥3, its input data sequence0, sequence1 and sequence2 use the sharing data output multiplexer 102H of its neighboring horizontal engine HE(j−3), HE(j−2) and HE(i−1) respectively. The sequence3 data of HE(j) always come from the vertical engine VE(k) output directly. Where k=integer of (j+3)/4.

Table 2 & Table 3 below show the input, output and internal control timing of the horizontal engine HE(0) 90 and HE(1) 100. Notice R0(91A), R1(91B), R2(91C), R3(91D) and R0(101A) are only enabled once every four clock cycle, and the intermediate register P0 (91E, 101B), P1 (91F, 101C)) latch data every two clock cycles.

Figure 9:
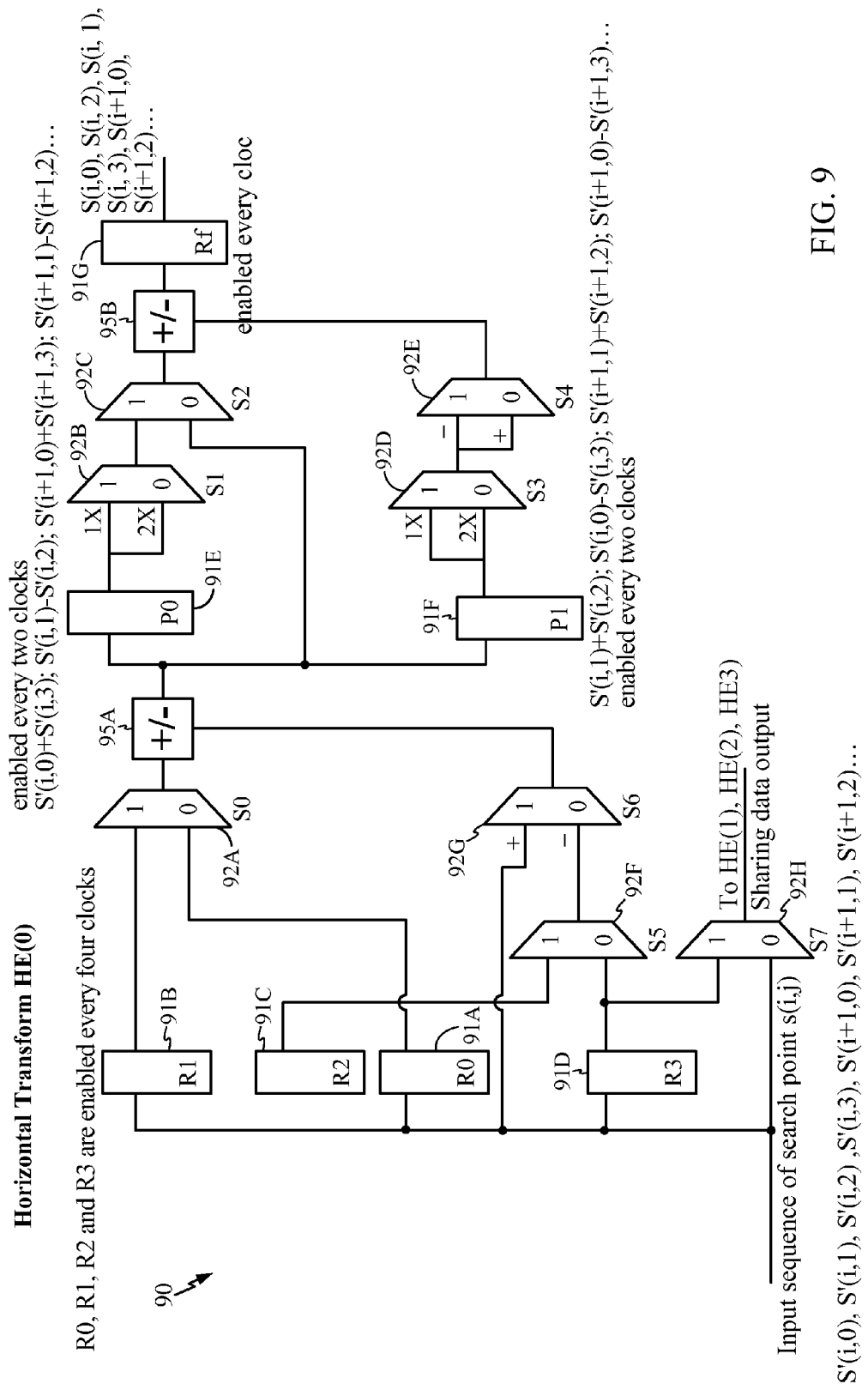
FIG. 9 is a block diagram illustrating an exemplary horizontal engine that may be used to transform the first 4 by 4 pixel block of a search space.
Figure 10:
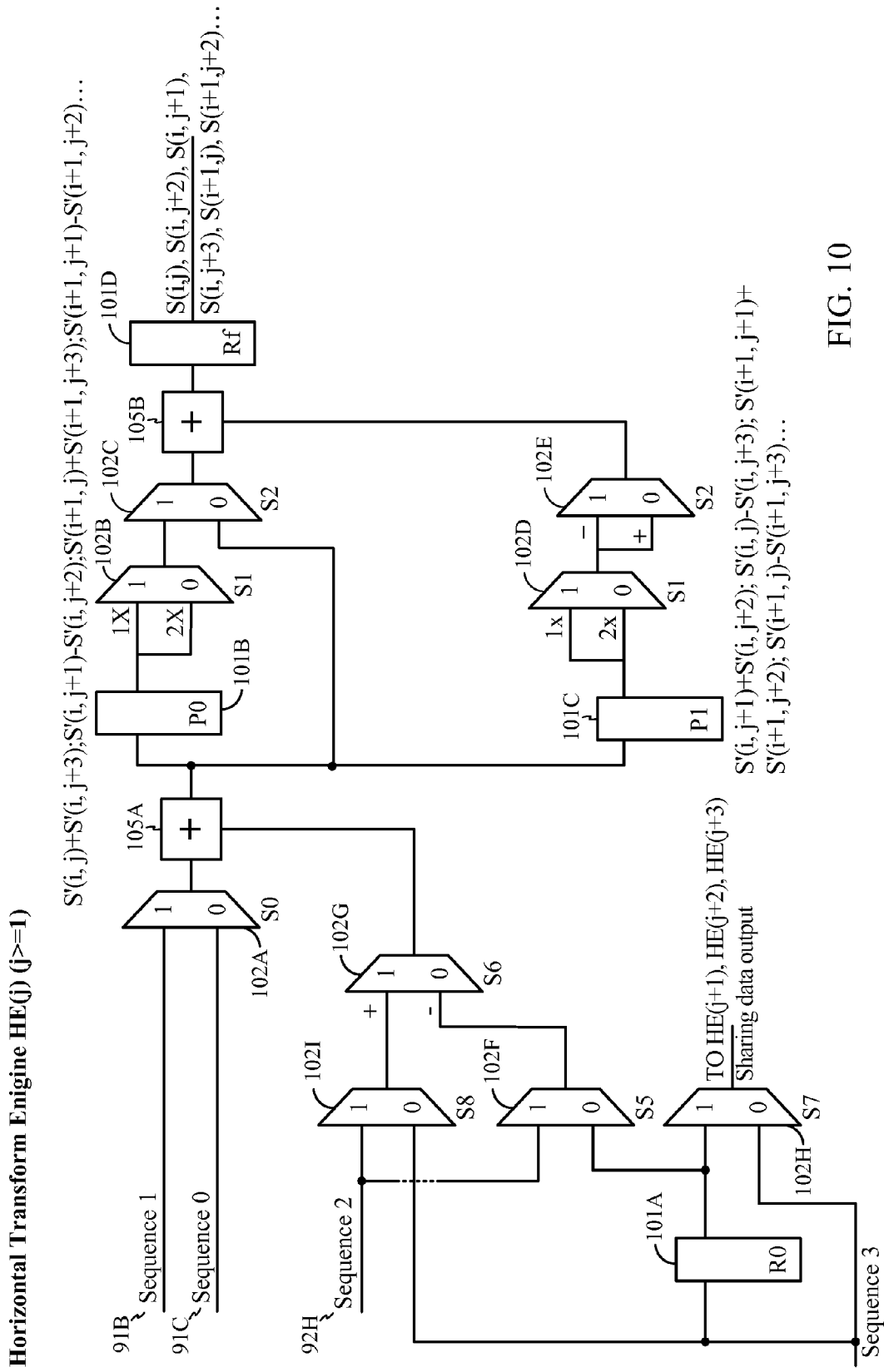
FIG. 10 is a block diagram illustrating an exemplary horizontal engine that may be used to transform the remaining 4 by 4 pixel block of a search space following a transformation performed by the horizontal engine shown in FIG. 8.

FIG. 9 illustrates an exemplary horizontal transformation engine HE(0) 90 (also referred to as a horizontal engine HE(0)). FIG. 10 illustrates an exemplary horizontal transformation engine HE(j) 100. Horizontal engine 90 of FIG. 9 includes various registers labeled R0 (91A), R1 (91B), R2 (91C), R3 (91D), P0 (91E), P1 (91F), and Rf (91G), multiplexers 92A, 92B 92C, 92D, 92E, 92F, 92G, 92H, and adders 95A and 95B. Horizontal engine 100 of FIG. 10 includes various registers labeled R0 (101A), P0 (101B), P1 (101C) and Rf (101D), multiplexers 102A, 102B 102C, 102D, 102E, 102F, 102G, 102H and 102I, and adders 105A and 105B. It should be noted that the registers shown in FIGS. 8, 9 and 10 may comprise physical structures in each respective engine, although the storage structures may be similar to one another. That is to say, e.g., register R0 (81A) in FIG. 8 is distinct from register R0 (91A) in FIG. 9.

Horizontal engine HE(0) 90 may be designed to transform the first 4 by 4 pixel column blocks (search points s(0,0), s(1,0) . . . s(M−3,0) from a search area of N by M size). In contrast, horizontal engine HE(j) 100 (shown in FIG. 10) may be used repetitively to transform the rest of the column blocks (search points s(0,j), s(1,j) . . . s(M−3,j) (1≤j≤N−3); Horizontal engine HE(0) 90 of FIG. 9 may correspond to HE(0) 66A of FIG. 5, and horizontal engine HE(j) 100 of FIG. 9 may correspond to each of HE(1) 66B, HE(2) 66C and HE(3) 66D of FIG. 5.

Horizontal engine HE(0) 90 latches broadcasted sequential pixel data from vertical engine VE(0) (FIG. 5) into four quarter pixel clocked data registers R0 (91A), R1 (91B), R2 (91C) and R3 (91D), performs intermediate transform functions, then stores the results in registers P0 (O1E) and P1 (91F). Registers P0 (01E) and P1 (91F) store the data for a second butterfly operation, and the result is delivered to the final register Rf (91 G).

The data latched in registers R0 (91A), R1 (9 1B), R2 (91C) and R3 (91D) of the horizontal engine 90 may be shared by the next three horizontal engines HE(1), HE(2,) HE(3) (see 66B-66D or FIG. 5). In general, for each horizontal engine HE(j) 100 (wherein j=1, 2 or 3), input data comes from multiplexing the HE(0) output, the VE(1) output, and the "previous" HE(j) engines.

Table 2 shows the timing and how the data is shared among the horizontal engines HE(0)-HE(3). In particular, Table 2 shows the timing information of horizontal engine HE(0) 66A working on search points s(0,0), s(1,0), s(2,0) . . . , and so forth. The pixel data starting at cycle 0 S'00 is the first pixel of the 4 by 4 block associated with search point s(0,0). The data starting at cycle 16 S'10 refers to first pixel of the 4 by 4 block for the search point s(1,0), and so forth. Table 2 can be easily extended to the ending search point s(M−3, 0) by applying a similar timing relationship to that presented in Table 2.

TABLE 2

Horizontal Engine HE(0) output timing chart.

| time | I/P | HE0 | | | | | | |
|---|---|---|---|---|---|---|---|---|
| | | R0 | R1 | R2 | R3 | P1 | P0 | Horizontal engine O/P |
| 0 | S'00 | | | | | | | |
| 1 | S'00 | S'00 | | | | | | |
| 1 | S'01 | S'00 | | | | | | |
| 2 | S'01 | S'00 | S'01 | | | | | |
| 2 | S'02 | S'00 | S'01 | | | | | |
| 3 | S'02 | S'00 | S'01 | S'02 | | S'01 + S'02 | | |
| 3 | S'03 | S'00 | S'01 | S'02 | | S'01 + S'02 | | |
| 4 | S'03 | S'00 | S'01 | S'02 | S'03 | S'01 + S'02 | S'00 + S'03 | S'00 + S'30 + S'10 + S'20 (S00) |
| 4 | S'10 | S'00 | S'01 | S'02 | S'03 | S'01 + S'02 | S'00 + S'03 | S'00 + S'30 + S'10 + S'20 (S00) |
| 5 | S'10 | S'10 | S'01 | S'02 | S'03 | S'00 + S'03 | S'00 + S'03 | S'00 + S'30 − S'10 − S'20 (S02) |
| 5 | S'11 | S'10 | S'01 | S'02 | S'03 | S'00 + S'03 | S'00 + S'03 | S'00 + S'30 − S'10 − S'20 (S02) |
| 6 | S'11 | S'10 | S'11 | S'02 | S'03 | S'00 + S'03 | S'01 + S'02 | 2S'00 − 2S'30 + S'10 − S'20 (S01) |
| 6 | S'12 | S'10 | S'11 | S'02 | S'03 | S'00 + S'03 | S'01 + S'02 | 2S'00 − 2S'30 + S'10 − S'20 (S01) |

TABLE 2-continued

Horizontal Engine HE(0) output timing chart.

| 7 | S'12 | S'10 | S'11 | S'12 | S'03 | S'11 + S'12 | S'01 - S'02 | S'00 - S'30 - 2S'10 + 2S'20 (S03) |
|---|---|---|---|---|---|---|---|---|
| 7 | S'13 | S'10 | S'11 | S'12 | S'03 | S'11 + S'12 | S'01 - S'02 | S'00 - S'30 - 2S'10 + 2S'20 (S03) |
| 8 | S'13 | S'10 | S'11 | S'12 | S'13 | S'11 + S'12 | S'10 + S'13 | S'10 + S'13 + S'11 + S'12 (S10) |
| 8 | S'20 | S'10 | S'11 | S'12 | S'13 | S'11 + S'12 | S'10 + S'13 | S'10 + S'13 + S'11 + S'12 (S10) |
| 9 | S'20 | S'20 | S'11 | S'12 | S'13 | S'10 - S'13 | S'10 + S'13 | S'10 + S'13 + S'11 + S'12 (S12) |
| 9 | S'21 | S'20 | S'11 | S'12 | S'13 | S'10 - S'13 | S'10 + S'13 | S'10 + S'13 + S'11 + S'12 (S12) |
| 10 | S'21 | S'20 | S'21 | S'12 | S'13 | S'10 - S'13 | S'11 - S'12 | 2S'10 - 2S'13 + S'11 - S'12 (S11) |
| 10 | S'22 | S'20 | S'21 | S'12 | S'13 | S'10 - S'13 | S'11 - S'12 | 2S'10 - 2S'13 + S'11 - S'12 (S11) |
| 11 | S'22 | S'20 | S'21 | S'22 | S'13 | S'21 + S'22 | S'11 - S'12 | S'10 - S'13 - 2S'11 + 2S'12 (S13) |
| 11 | S'23 | S'20 | S'21 | S'22 | S'13 | S'21 + S'22 | S'11 - S'12 | S'10 - S'13 - 2S'11 + 2S'12 (S13) |
| 12 | S'23 | S'20 | S'21 | S'22 | S'23 | S'21 + S'22 | S'20 + S'23 | S'20 + S'23 + S'21 + S'22 (S20) |
| 12 | S'30 | S'20 | S'21 | S'22 | S'23 | S'21 + S'22 | S'20 + S'23 | S'20 + S'23 + S'21 + S'22 (S20) |
| 13 | S'30 | S'30 | S'21 | S'22 | S'23 | S'20 - S'23 | S'20 + S'23 | S'20 + S'23 - S'31 - S'32 (S22) |
| 13 | S'31 | S'30 | S'21 | S'22 | S'23 | S'20 - S'23 | S'20 + S'23 | S'20 + S'23 - S'31 - S'32 (S22) |
| 14 | S'31 | S'30 | S'31 | S'22 | S'23 | S'20 - S'23 | S'21 - S'22 | 2S'20 - 2S'23 + S'21 - S'22 (S21) |
| 14 | S'32 | S'30 | S'31 | S'22 | S'23 | S'20 - S'23 | S'21 - S'22 | 2S'20 - 2S'23 + S'21 - S'22 (S21) |
| 15 | S'32 | S'30 | S'31 | S'32 | S'23 | S'31 + S'32 | S'21 - S'22 | S'20 - S'23 - 2S'21 + 2S'22 (S23) |
| 15 | S'33 | S'30 | S'31 | S'32 | S'23 | S'31 + S'32 | S'21 - S'22 | S'20 - S'23 - 2S'21 + 2S'22 (S23) |
| 16 | S'33 | S'30 | S'31 | S'32 | S'33 | S'31 + S'32 | S'30 + S'33 | S'30 + S'33 + S'31 + S'32 (S30) |
| 16 | S'10 | S'30 | S'31 | S'32 | S'33 | S'31 + S'32 | S'30 + S'33 | S'30 + S'33 + S'31 + S'32 (S30) |
| 17 | S'10 | S'10 | S'31 | S'32 | S'33 | S'30 - S'33 | S'30 + S'33 | S'30 + S'33 - S'31 - S'32 (S32) |
| 17 | S'11 | S'10 | S'31 | S'32 | S'33 | S'30 - S'33 | S'30 + S'33 | S'30 + S'33 - S'31 - S'32 (S32) |
| 18 | S'11 | S'10 | S'11 | S'32 | S'33 | S'30 - S'33 | S'31 - S'32 | 2S'30 - 2S'33 + S'31 - S'32 (S31) |
| 18 | S'12 | S'10 | S'11 | S'32 | S'33 | S'30 - S'33 | S'31 - S'32 | 2S'30 - 2S'33 + S'31 - S'32 (S31) |
| 19 | S'12 | S'10 | S'11 | S'12 | S'33 | S'11 + S'12 | S'31 - S'32 | S'30 - S'33 - 2S'31 + 2S'32 (S33) |
| 19 | S'13 | S'10 | S'11 | S'12 | S'33 | S'11 + S'12 | S'31 - S'32 | S'30 - S'33 - 2S'31 + 2S'32 (S33) |
| 20 | S'13 | S'10 | S'11 | S'12 | S'13 | S'11 + S'12 | S'10 + S'13 | S'10 + S'13 + S'11 + S'12 (S10) |
| 20 | S'20 | S'10 | S'11 | S'12 | S'13 | S'11 + S'12 | S'10 + S'13 | S'10 + S'13 + S'11 + S'12 (S10) |
| 21 | S'20 | S'20 | S'11 | S'12 | S'13 | S'10 - S'13 | S'10 + S'13 | S'10 + S'13 - S'11 - S'12 (S12) |
| 21 | S'21 | S'20 | S'11 | S'12 | S'13 | S'10 - S'13 | S'10 + S'13 | S'10 + S'13 - S'11 - S'12 (S12) |
| 22 | S'21 | S'20 | S'21 | S'12 | S'13 | S'10 - S'13 | S'11 - S'12 | 2S'10 - 2S'13 + S'11 - S'12 (S11) |
| 22 | S'22 | S'20 | S'21 | S'12 | S'13 | S'10 - S'13 | S'11 - S'12 | 2S'10 - 2S'13 + S'11 - S'12 (S11) |
| 23 | S'22 | S'20 | S'21 | S'22 | S'13 | S'21 + S'22 | S'11 - S'12 | S'10 - S'13 - 2S'11 + 2S'12 (S13) |
| 23 | S'23 | S'20 | S'21 | S'22 | S'13 | S'21 + S'22 | S'11 - S'12 | S'10 - S'13 - 2S'11 + 2S'12 (S13) |

Table 3 displays the 16 pixel timing of the HE(1) engine for the 4×4 matching area of the search point s(0,1) and part of pixel timing of search point s(1,1) which starts from cycle seventeen. Data sequence0 sequence1 and sequence3 in the Table 3 are copies from the R1, R2 & R3 register values from horizontal engine HE(0), which are shared among horizontal engines HE(1) to HE(3). The register values are listed in Table 3 to illustrate the timing relationship and data flow between HE(0) and HE(1). Notably, by using a "divided down" pixel clock frequency, the equivalent clocking power can be achieved by using more registers. For example, HE(1) may have four physical registers in a design with clocking power equivalent to 2.25 registers, and HE(0) may have seven registers with clocking power equivalent to three registers.

TABLE 3

Horizontal Engine HE(1) output timing chart.

| time | I/P | HE0 | | | | | | |
|---|---|---|---|---|---|---|---|---|
| 0 | | Seq0 | Seq1 | Seq2 | R0 | P1 | P0 | Horizontal engine O/P |
| 1 | | | | | | | | |
| 1 | S'01 | | | | | | | |
| 2 | S'01 | S'01 | | | | | | |
| 2 | S'02 | S'01 | | | | | | |
| 3 | S'02 | S'01 | S'02 | | | | | |
| 3 | S'03 | S'01 | S'02 | | | | | |
| 4 | S'03 | S'01 | S'02 | S'03 | | S'02 + S'03 | | |
| 4 | S'04 | S'01 | S'02 | S'03 | | S'02 + S'03 | | |
| 5 | S'04 | S'01 | S'02 | S'03 | S'04 | S'02 + S'03 | S'01 + S'04 | S'01 + S'04 + S'02 + S'03 (S01) |
| 5 | S'11 | S'01 | S'02 | S'03 | S'04 | S'02 + S'03 | S'01 + S'04 | S'01 + S'04 + S'02 + S'03 (S01) |

TABLE 3-continued

Horizontal Engine HE(1) output timing chart.

| | | | | | | | | |
|---|---|---|---|---|---|---|---|---|
| 6 | S'11 | | S'11 | S'02 | S'03 | S'04 | S'01 - S'04 | S'01 + S'04 | S'01 + S'04 - S'02 - S'03 (S03) |
| 6 | S'12 | | S'11 | S'02 | S'03 | S'04 | S'01 - S'04 | S'01 + S'04 | S'01 + S'04 - S'02 - S'03 (S03) |
| 7 | S'12 | | S'11 | S'12 | S'03 | S'04 | S'01 - S'04 | S'02 - S'03 | 2S'01 - 2S'04 + S'02 - S'03 (S02) |
| 7 | S'13 | | S'11 | S'12 | S'03 | S'04 | S'01 - S'04 | S'02 - S'03 | 2S'01 - 2S'04 + S'02 - S'03 (S02) |
| 8 | S'13 | | S'11 | S'12 | S'13 | S'04 | S'12 + S'13 | S'02 - S'03 | S'01 - S'04 - 2S'02 + 2S'03 (S04) |
| 8 | S'14 | | S'11 | S'12 | S'13 | S'04 | S'12 + S'13 | S'02 - S'03 | S'01 - S'04 - 2S'02 + 2S'03 (S04) |
| 9 | S'14 | | S'11 | S'12 | S'13 | S'14 | S'12 + S'13 | S'11 + S'14 | S'11 + S'14 + S'12 + S'13 (S11) |
| 9 | S'21 | | S'11 | S'12 | S'13 | S'14 | S'12 + S'13 | S'11 + S'14 | S'11 + S'14 + S'12 + S'13 (S11) |
| 10 | S'21 | | S'21 | S'12 | S'13 | S'14 | S'11 - S'14 | S'11 + S'14 | S'11 + S'14 - S'12 - S'13 (S13) |
| 10 | S'22 | | S'21 | S'12 | S'13 | S'14 | S'11 - S'14 | S'11 + S'14 | S'11 + S'14 - S'12 - S'13 (S13) |
| 11 | S'22 | | S'21 | S'22 | S'13 | S'14 | S'11 - S'14 | S'12 - S'13 | 2S'11 - 2S'14 + S'12 - S'13 (S12) |
| 11 | S'23 | | S'21 | S'22 | S'13 | S'14 | S'11 - S'14 | S'12 - S'13 | 2S'11 - 2S'14 + S'12 - S'13 (S12) |
| 12 | S'23 | | S'21 | S'22 | S'23 | S'14 | S'22 + S'23 | S'12 - S'13 | S'11 - S'14 - 2S'12 + 2S'13 (S14) |
| 12 | S'24 | | S'21 | S'22 | S'23 | S'14 | S'22 + S'23 | S'12 - S'13 | S'11 - S'14 - 2S'12 + 2S'13 (S14) |
| 13 | S'24 | | S'21 | S'22 | S'23 | S'24 | S'22 + S'23 | S'21 + S'24 | S'21 + S'24 + S'22 + S'23 (S21) |
| 13 | S'31 | | S'21 | S'22 | S'23 | S'24 | S'22 + S'23 | S'21 + S'24 | S'21 + S'24 + S'22 + S'23 (S21) |
| 14 | S'31 | | S'31 | S'22 | S'23 | S'24 | S'21 - S'24 | S'21 + S'24 | S'21 + S'24 - S'22 - S'23 (S23) |
| 14 | S'32 | | S'31 | S'22 | S'23 | S'24 | S'21 - S'24 | S'21 + S'24 | S'21 + S'24 - S'22 - S'23 (S23) |
| 15 | S'32 | | S'31 | S'32 | S'23 | S'24 | S'21 - S'24 | S'22 - S'23 | 2S'21 - 2S'24 + S'22 - S'23 (S22) |
| 15 | S'33 | | S'31 | S'32 | S'23 | S'24 | S'21 - S'24 | S'22 - S'23 | 2S'21 - 2S'24 + S'22 - S'23 (S22) |
| 16 | S'33 | | S'31 | S'32 | S'33 | S'24 | S'32 + S'33 | S'22 - S'23 | S'21 - S'24 - 2S'22 + 2S'23 (S24) |
| 16 | S'34 | | S'31 | S'32 | S'33 | S'24 | S'32 + S'33 | S'22 - S'23 | S'21 - S'24 - 2S'22 + 2S'23 (S24) |
| 17 | S'34 | | S'31 | S'32 | S'33 | S'34 | S'32 + S'33 | S'31 + S'34 | S'31 + S'34 + S'32 + S'33 (S31) |
| 17 | S'11 | | S'31 | S'32 | S'33 | S'34 | S'32 + S'33 | S'31 + S'34 | S'31 + S'34 + S'32 + S'33 (S31) |
| 18 | S'11 | | S'11 | S'32 | S'33 | S'34 | S'31 - S'34 | S'31 + S'34 | S'31 + S'34 - S'32 - S'33 (S33) |
| 18 | S'12 | | S'11 | S'32 | S'33 | S'34 | S'31 - S'34 | S'31 + S'34 | S'31 + S'34 - S'32 - S'33 (S33) |
| 19 | S'12 | | S'11 | S'12 | S'33 | S'34 | S'31 - S'34 | S'32 - S'33 | 2S'31 - 2S'34 + S'32 - S'33 (S32) |
| 19 | S'13 | | S'11 | S'12 | S'33 | S'34 | S'31 - S'34 | S'32 - S'33 | 2S'31 - 2S'34 + S'32 - S'33 (S32) |
| 20 | S'13 | | S'11 | S'12 | S'13 | S'34 | S'12 + S'13 | S'32 - S'33 | S'31 - S'34 - 2S'32 + 2S'33 (S34) |
| 20 | S'14 | | S'11 | S'12 | S'13 | S'34 | S'12 + S'13 | S'32 - S'33 | S'31 - S'34 - 2S'32 + 2S'33 (S34) |
| 21 | S'14 | | S'11 | S'12 | S'13 | S'14 | S'12 + S'13 | S'11 + S'14 | S'11 + S'14 + S'12 + S'13 (S11) |
| 21 | S'21 | | S'11 | S'12 | S'13 | S'14 | S'12 + S'13 | S'11 + S'14 | S'11 + S'14 + S'12 + S'13 (S11) |
| 22 | S'21 | | S'21 | S'12 | S'13 | S'14 | S'11 - S'14 | S'11 + S'14 | S'11 + S'14 - S'12 - S'13 (S13) |
| 22 | S'22 | | S'21 | S'12 | S'13 | S'14 | S'11 - S'14 | S'11 + S'14 | S'11 + S'14 - S'12 - S'13 (S13) |
| 23 | S'22 | | S'21 | S'22 | S'13 | S'14 | S'11 - S'14 | S'12 - S'13 | 2S'11 - 2S'14 + S'12 - S'13 (S12) |
| 23 | S'23 | | S'21 | S'22 | S'13 | S'14 | S'11 - S'14 | S'12 - S'13 | 2S'11 - 2S'14 + S'12 - S'13 (S12) |

Table 4 shows an exemplary timing relationship among VE(0), VE(1), HE(0), HE(1), HE(2) and HE(3). In particular, Table 4 illustrates the input timing relationship among the vertical and horizontal engines VE(k) and HE(j), (k=0, 1. j=0,1,2,3) and how the vertical transformed data is shared among the horizontal engines HE(j). Table 4 only provides the timing information for search point s(i, j), where i=0, 1, 2 . . . 4; j=0, 1, . . . 3. A similar timing pattern can easily be developed for all s(i,j) search points with i=0, 1, 2 . . . M−3; j=0, 1, . . . N−3.

TABLE 4

| | V Engine Output After TM | | H Engine Input sequences | | | |
|---|---|---|---|---|---|---|
| Time | VE(0) | VE(1) | HE(0) | HE(1) | HE(2) | HE(3) |
| 0 | S'0(0, 0) | | S'0(0, 0) | | | |
| 1 | S'0(0, 1) | | S'0(0, 1) | S'0(0, 1) | | |
| 2 | S'0(0, 2) | | S'0(0, 2) | S'0(0, 2) | S'0(0, 2) | |
| 3 | S'0(0, 3) | | S'0(0, 3) | S'0(0, 3) | S'0(0, 3) | S'0(0, 3) |
| 4 | S'0(1, 0) | S'0(0, 4) | S'0(1, 0) | S'0(0, 4) | S'0(0, 4) | S'0(0, 4) |
| 5 | S'0(1, 1) | S'0(0, 5) | S'0(1, 1) | S'0(1, 1) | S'0(0, 5) | S'0(0, 5) |
| 6 | S'0(1, 2) | S'0(0, 6) | S'0(1, 2) | S'0(1, 2) | S'0(1, 2) | S'0(0, 6) |
| 7 | S'0(1, 3) | S'0(0, 7) | S'0(1, 3) | S'0(1, 3) | S'0(1, 3) | S'0(1, 3) |
| 8 | S'0(2, 0) | S'0(1, 4) | S'0(2, 0) | S'0(1, 4) | S'0(1, 4) | S'0(1, 4) |
| 9 | S'0(2, 1) | S'0(1, 5) | S'0(2, 1) | S'0(2, 1) | S'0(1, 5) | S'0(1, 5) |
| 10 | S'0(2, 2) | S'0(1, 6) | S'0(2, 2) | S'0(2, 2) | S'0(2, 2) | S'0(1, 6) |
| 11 | S'0(2, 3) | S'0(1, 7) | S'0(2, 3) | S'0(2, 3) | S'0(2, 3) | S'0(2, 3) |
| 12 | S'0(3, 0) | S'0(2, 4) | S'0(3, 0) | S'0(2, 4) | S'0(2, 4) | S'0(2, 4) |
| 13 | S'0(3, 1) | S'0(2, 5) | S'0(3, 1) | S'0(3, 1) | S'0(2, 5) | S'0(2, 5) |

TABLE 4-continued

| | V Engine Output After TM | | H Engine Input sequences | | | |
|---|---|---|---|---|---|---|
| Time | VE(0) | VE(1) | HE(0) | HE(1) | HE(2) | HE(3) |
| 14 | S'0(3, 2) | S'0(2, 6) | S'0(3, 2) | S'0(3, 2) | S'0(3, 2) | S'0(2, 6) |
| 15 | S'0(3, 3) | S'0(2, 7) | S'0(3, 3) | S'0(3, 3) | S'0(3, 3) | S'0(3, 3) |
| 16 | S'1(1, 0) | S'0(3, 4) | S'1(1, 0) | S'0(3, 4) | S'0(3, 4) | S'0(3, 4) |
| 17 | S'1(1, 1) | S'0(3, 5) | S'1(1, 1) | S'1(1, 1) | S'0(3, 5) | S'0(3, 5) |
| 18 | S'1(1, 2) | S'0(3, 6) | S'1(1, 2) | S'1(1, 2) | S'1(1, 2) | S'0(3, 6) |
| 19 | S'1(1, 3) | S'0(3, 7) | S'1(1, 3) | S'1(1, 3) | S'1(1, 3) | S'1(1, 3) |
| 20 | S'1(2, 0) | S'1(1, 4) | S'1(2, 0) | S'1(1, 4) | S'1(1, 4) | S'1(1, 4) |
| 21 | S'1(2, 1) | S'1(1, 5) | S'1(2, 1) | S'1(2, 1) | S'1(1, 5) | S'1(1, 5) |
| 22 | S'1(2, 2) | S'1(1, 6) | S'1(2, 2) | S'1(2, 2) | S'1(2, 2) | S'1(1, 6) |
| 23 | S'1(2, 3) | S'1(1, 7) | S'1(2, 3) | S'1(2, 3) | S'1(2, 3) | S'1(2, 3) |
| 24 | S'1(3, 0) | S'1(2, 4) | S'1(3, 0) | S'1(2, 4) | S'1(2, 4) | S'1(2, 4) |
| 25 | S'1(3, 1) | S'1(2, 5) | S'1(3, 1) | S'1(3, 1) | S'1(2, 5) | S'1(2, 5) |
| 26 | S'1(3, 2) | S'1(2, 6) | S'1(3, 2) | S'1(3, 2) | S'1(3, 2) | S'1(2, 6) |
| 27 | S'1(3, 3) | S'1(2, 7) | S'1(3, 3) | S'1(3, 3) | S'1(3, 3) | S'1(3, 3) |
| 28 | S'1(4, 0) | S'1(3, 4) | S'1(4, 0) | S'1(3, 4) | S'1(3, 4) | S'1(3, 4) |
| 29 | S'1(4, 1) | S'1(3, 5) | S'1(4, 1) | S'1(4, 1) | S'1(3, 5) | S'1(3, 5) |
| 30 | S'1(4, 2) | S'1(3, 6) | S'1(4, 2) | S'1(4, 2) | S'1(4, 2) | S'1(3, 6) |
| 31 | S'1(4, 3) | S'1(3, 7) | S'1(4, 3) | S'1(4, 3) | S'1(4, 3) | S'1(4, 3) |
| 32 | S'2(2, 0) | S'1(4, 4) | S'2(2, 0) | S'1(4, 4) | S'1(4, 4) | S'1(4, 4) |
| 33 | S'2(2, 1) | S'1(4, 5) | S'2(2, 1) | S'2(2, 1) | S'1(4, 5) | S'1(4, 5) |
| 34 | S'2(2, 2) | S'1(4, 6) | S'2(2, 2) | S'2(2, 2) | S'2(2, 2) | S'1(4, 6) |
| 35 | S'2(2, 3) | S'1(4, 7) | S'2(2, 3) | S'2(2, 3) | S'2(2, 3) | S'2(2, 3) |
| 36 | S'2(3, 0) | S'2(2, 4) | S'2(3, 0) | S'2(2, 4) | S'2(2, 4) | S'2(2, 4) |
| 37 | S'2(3, 1) | S'2(2, 5) | S'2(3, 1) | S'2(3, 1) | S'2(2, 5) | S'2(2, 5) |
| 38 | S'2(3, 2) | S'2(2, 6) | S'2(3, 2) | S'2(3, 2) | S'2(3, 2) | S'2(2, 6) |
| 39 | S'2(3, 3) | S'2(2, 7) | S'2(3, 3) | S'2(3, 3) | S'2(3, 3) | S'2(3, 3) |
| 40 | S'2(4, 0) | S'2(3, 4) | S'2(4, 0) | S'2(3, 4) | S'2(3, 4) | S'2(3, 4) |
| 41 | S'2(4, 1) | S'2(3, 5) | S'2(4, 1) | S'2(4, 1) | S'2(3, 5) | S'2(3, 5) |
| 42 | S'2(4, 2) | S'2(3, 6) | S'2(4, 2) | S'2(4, 2) | S'2(4, 2) | S'2(3, 6) |
| 43 | S'2(4, 3) | S'2(3, 7) | S'2(4, 3) | S'2(4, 3) | S'2(4, 3) | S'2(4, 3) |
| 44 | S'2(5, 0) | S'2(4, 4) | S'2(5, 0) | S'2(4, 4) | S'2(4, 4) | S'2(4, 4) |
| 45 | S'2(5, 1) | S'2(4, 5) | S'2(5, 1) | S'2(5, 1) | S'2(4, 5) | S'2(4, 5) |
| 46 | S'2(5, 2) | S'2(4, 6) | S'2(5, 2) | S'2(5, 2) | S'2(5, 2) | S'2(4, 6) |
| 47 | S'2(5, 3) | S'2(4, 7) | S'2(5, 3) | S'2(5, 3) | S'2(5, 3) | S'2(5, 3) |
| 48 | S'3(3, 0) | S'2(5, 4) | S'3(3, 0) | S'2(5, 4) | S'2(5, 4) | S'2(5, 4) |
| 49 | S'3(3, 1) | S'2(5, 5) | S'3(3, 1) | S'3(3, 1) | S'2(5, 5) | S'2(5, 5) |
| 50 | S'3(3, 2) | S'2(5, 6) | S'3(3, 2) | S'3(3, 2) | S'3(3, 2) | S'2(5, 6) |
| 51 | S'3(3, 3) | S'2(5, 7) | S'3(3, 3) | S'3(3, 3) | S'3(3, 3) | S'3(3, 3) |
| 52 | S'3(4, 0) | S'3(3, 4) | S'3(4, 0) | S'3(3, 4) | S'3(3, 4) | S'3(3, 4) |
| 53 | S'3(4, 1) | S'3(3, 5) | S'3(4, 1) | S'3(4, 1) | S'3(3, 5) | S'3(3, 5) |
| 54 | S'3(4, 2) | S'3(3, 6) | S'3(4, 2) | S'3(4, 2) | S'3(4, 2) | S'3(3, 6) |
| 55 | S'3(4, 3) | S'3(3, 7) | S'3(4, 3) | S'3(4, 3) | S'3(4, 3) | S'3(4, 3) |
| 56 | S'3(5, 0) | S'3(4, 4) | S'3(5, 0) | S'3(4, 4) | S'3(4, 4) | S'3(4, 4) |
| 57 | S'3(5, 1) | S'3(4, 5) | S'3(5, 1) | S'3(5, 1) | S'3(4, 5) | S'3(4, 5) |
| 58 | S'3(5, 2) | S'3(4, 6) | S'3(5, 2) | S'3(5, 2) | S'3(5, 2) | S'3(4, 6) |
| 59 | S'3(5, 3) | S'3(4, 7) | S'3(5, 3) | S'3(5, 3) | S'3(5, 3) | S'3(5, 3) |
| 60 | S'3(6, 0) | S'3(5, 4) | S'3(6, 0) | S'3(5, 4) | S'3(5, 4) | S'3(5, 4) |
| 61 | S'3(6, 1) | S'3(5, 5) | S'3(6, 1) | S'3(6, 1) | S'3(5, 5) | S'3(5, 5) |
| 62 | S'3(6, 2) | S'3(5, 6) | S'3(6, 2) | S'3(6, 2) | S'3(6, 2) | S'3(5, 6) |
| 63 | S'3(6, 3) | S'3(5, 7) | S'3(6, 3) | S'3(6, 3) | S'3(6, 3) | S'3(6, 3) |
| 64 | S'4(4, 0) | S'3(6, 4) | S'4(4, 0) | S'3(6, 4) | S'3(6, 4) | S'3(6, 4) |
| 65 | S'4(4, 1) | S'3(6, 5) | S'4(4, 1) | S'4(4, 1) | S'3(6, 5) | S'3(6, 5) |
| 66 | S'4(4, 2) | S'3(6, 6) | S'4(4, 2) | S'4(4, 2) | S'4(4, 2) | S'3(6, 6) |
| 67 | S'4(4, 3) | S'3(6, 7) | S'4(4, 3) | S'4(4, 3) | S'4(4, 3) | S'4(4, 3) |
| 68 | S'4(5, 0) | S'4(4, 4) | S'4(5, 0) | S'4(4, 4) | S'4(4, 4) | S'4(4, 4) |
| 69 | S'4(5, 1) | S'4(4, 5) | S'4(5, 1) | S'4(5, 1) | S'4(4, 5) | S'4(4, 5) |
| 70 | S'4(5, 2) | S'4(4, 6) | S'4(5, 2) | S'4(5, 2) | S'4(5, 2) | S'4(4, 6) |
| 71 | S'4(5, 3) | S'4(4, 7) | S'4(5, 3) | S'4(5, 3) | S'4(5, 3) | S'4(5, 3) |
| 72 | S'4(6, 0) | S'4(5, 4) | S'4(6, 0) | S'4(5, 4) | S'4(5, 4) | S'4(5, 4) |
| 73 | S'4(6, 1) | S'4(5, 5) | S'4(6, 1) | S'4(6, 1) | S'4(5, 5) | S'4(5, 5) |
| 74 | S'4(6, 2) | S'4(5, 6) | S'4(6, 2) | S'4(6, 2) | S'4(6, 2) | S'4(5, 6) |
| 75 | S'4(6, 3) | S'4(5, 7) | S'4(6, 3) | S'4(6, 3) | S'4(6, 3) | S'4(6, 3) |
| 76 | S'4(7, 0) | S'4(6, 4) | S'4(7, 0) | S'4(6, 4) | S'4(6, 4) | S'4(6, 4) |
| 77 | S'4(7, 1) | S'4(6, 5) | S'4(7, 1) | S'4(7, 1) | S'4(6, 5) | S'4(6, 5) |
| 78 | S'4(7, 2) | S'4(6, 6) | S'4(7, 2) | S'4(7, 2) | S'4(7, 2) | S'4(6, 6) |
| 79 | S'4(7, 3) | S'4(6, 7) | S'4(7, 3) | S'4(7, 3) | S'4(7, 3) | S'4(7, 3) |

An FTE transformation architecture is not only determined by the engines, but also the data flowing in between the vertical and horizontal engines. Since the architecture may comprise a pixel rate pipelined design, any skewed data flow between the engines can stall the pipeline. In order to avoid this problem, transposition memories 65A and 65B may be used in between the engines to buffer and account for timing of the data.

The techniques of this disclosure allow transformations to be performed with respect to a set of blocks of video data in a pipelined manner. In particular, the horizontal engines and vertical engines may operate simultaneously for at least part of the transformations such that data is pipelined through FTE 60 (FIG. 5). For example, as shown in FIG. 5, data can be processed by vertical engines 64A and 64B and the output can be stored in transposition memories 65A and 65B. Upon processing all of the vertical data associated with a first video block, vertical engines 64A and 64B may then process vertical data associated with a second video block (re-using intermediate results as appropriate). Transposition memories 65A and 65B allow the output of vertical engines 64A and 64B to be stored as long as needed before such data can be processed by one of horizontal engines 66A-66D. In this manner, data is pipelined through FTE 60.

In general, the maximum amount of timing skew between data generation by one of vertical engines 64A or 64B, and consumption by one or horizontal engines 66A-66D defines the minimum amount of the transposition memory (TM) required. In order to have the smallest TM between the conversions, it is generally advisable to:

1. Minimize the data timing skew between the feeder engine (generator) and the receptor (consuming) engine, and
2. Consume the generated feeder engine data as soon as possible.

One way to implement a TM is using random access memory (RAM). The disadvantages of the RAM-based design are:

1. The address size of RAM (equal to timing skew and less than 16 clock cycles) is small and the shape of the RAM may not be efficient in the physical design. Notably, between two 4 by 4 transformations, the maximum timing skew may be 15 clock cycles.
2. During the 16 clock cycles of each 4 by 4 transformation, memory can be read from and written to multiple times during the same clock cycle. This means the RAM has to run at twice of the pixel clock rate unless two-port RAM is used.
3. For a smaller RAM-based design, the memory test logic offsets its area advantage.

Given these factors, the use of RAM as the transpose memory in between vertical and horizontal engines can be considered when the physical implementation on silicon does not experience difficulties.

Another TM design approach is a register based design. The same pipelining techniques may be used regardless of whether transposition memory or transposition registers are used. FIG. 11 illustrates how input blocks may be defined in a search space. FIG. 12 illustrates input and output data flow in between the vertical and horizontal engines. Tracking the index in a manner shown in FIG. 12 in order to facilitate re-ordering of the vertical engine input data and vertical engine output data relative to the horizontal engine input data may improve the efficiency of the transformation process. A vertical engine design with pixel input in s00, s30, s10, s20 ... s01, ... s23 sequence may use the fewest components. In this case, the VE transform output follows the S'00, S'20, S'10, S'30 ... S'33 format. This may be done in a purely logical manner by tracking the index into an array to keep track of the re-ordering of the input vertical engine data to the output vertical engine data. Tracking the index allows the data to be stored in one location without updating memories, and eliminates unnecessary write operations. A person of ordinary skill in the art would also recognize that re-ordering by re-writing the data into memory may also be done.

In order to share the input data, it is desirable for the horizontal engine input to be in a sequential format. In this case, a pipelining technique may be employed whereby the horizontal and vertical engines work in parallel with respect to a pipeline of video data. For efficient pipelined data processing, the horizontal engine may input the first data generated by the vertical engine as soon it is available. So the horizontal input may be in the S'00, S'01, S'02, S'03 ... S'33 sequence format. Comparing the vertical engine output sequences (Ver. O/P seq.) in FIG. 12, and horizontal engine input sequences (Hor. I/P seq.), the largest corresponding difference is 13—4=9, which it indicates nine transposition (transpose) registers may be needed in this case. One of ordinary skill in the art would recognize that a larger block size may require a different number of transposition registers. The number is related to the earliest time the data is available for processing. By selecting the proper number of transposition registers, pipelining can be supported in an efficient manner such that extra registers are avoided. In this case, nine transposition registers may be sufficient to save all necessary data for a sufficient time to allow such data to be used in the data processing pipeline as soon as possible without needing extra or excessive amounts of memory or registers.

FIG. 13 depicts the number of transpose registers (TRs) that may be used between the vertical and horizontal engines. The numbers on the left side of FIG. 13 are time marks. Thus, in this example, at time T1, the vertical engine outputs S'00, at T2, it outputs S'20 ... and so forth. The shaded area in FIG. 13 represents how long the vertical engine (feeder) output stores in a TR before it is consumed by the horizontal (receptor) engine. Here the horizontal engine starts consuming the output of the vertical engine from time T10 and finishes at time T25. The numbers on the right side of FIG. 12 represent the number of TRs needed at each time mark, which equals to the total amount of gray area. The total TR estimated by FIG. 13 is also nine. Note that the pixel number at time 13 is directly fed into the horizontal engine without latching into a TR.

A number of techniques and examples have been described. The described techniques may be implemented in hardware, software, firmware, or any combination thereof. If implemented in software, the techniques described herein may be embodied in a computer readable medium comprising instructions that upon execution in a device to perform one or more of the techniques described above. For example, the instructions, upon execution, may cause a video coding device to perform transformations on blocks of video data, wherein performing the transformations includes re-using computations associated with a first transformation of a first block of video data in a second transformation of a second block of video data.

The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The instructions may be executed by one or more processors or other machines, such as one or more digital signal processors (DSPs), general purpose microprocessors, one or more application specific integrated circuits (ASICs), one or more field programmable logic arrays (FPGAs), or other equivalent integrated or discrete logic circuitry. In some embodiments, the functionality described herein may be provided within dedicated software modules or hardware units configured for encoding and decoding audio or multimedia information, or incorporated in a combined multimedia encoder-decoder (CODEC).

If implemented in a hardware circuit, this disclosure may be directed to a circuit configured to perform transformations on blocks of video data, wherein in performing the transformations the circuit re-uses one or more computations associated with a first transformation of a first block of video data in a second transformation of a second block of video data. For example, the circuit may comprise an integrated circuit or set of circuits that form a chipset. The circuit may comprise an ASIC, an FPGA, various logic circuits, integrated circuits, or combinations thereof.

These and other embodiments are within the scope of the following claims.

What is claimed is:

1. An electronic device comprising a processor configured to transform blocks of video data from pixel values to frequency values, wherein the processor, in transforming a first block of video data included in the blocks of video data, is configured to:
   obtain a result stored in a memory coupled with the processor, the result generated via a first iteration of a transformation process applied to a second block of video data included in the blocks of video data; and
   transform the first block via a second iteration of the transformation process, the transform based in part on the obtained result, wherein the first block of video data includes at least one portion of video data that is not included in the second block of video data and wherein the second block of video data includes at least one portion of video data that is not included in the first block of video data.

2. The device of claim 1, wherein the processor is configured to transform blocks of video data using at least one of integer and discrete cosine transformations (DCTs).

3. The device of claim 1, wherein the processor includes a motion estimator, and the motion estimator includes a transform engine configured to transform the blocks of video data.

4. The device of claim 3, wherein the first block of video data and the second block of video data comprise video data associated with a search space, wherein the transform engine is further configured to transform a block of video data to be encoded.

5. The device of claim 1, wherein the processor is configured to transform four or more blocks of video data within a search space, wherein the processor is configured to re-use a result of a computation in the transformation of at least three of the blocks of video data within the search space.

6. The device of claim 1,
   wherein the blocks of video data comprise 4 by 4 pixel blocks,
   wherein the processor is configured to generate an intermediate result based on 1-dimensional transforms on rows of the 4 by 4 pixel blocks, the processor further configured to transform a column of the intermediate results using a 1-dimensional transform, and
   wherein the re-used computations comprise at least some of the intermediate results.

7. The device of claim 6, wherein the processor includes a first engine configured to transform blocks of video data horizontally and a second engine configured to transform blocks of video data vertically.

8. The device of claim 7, the processor further comprising one or more transposition memories between the first engine and the second engine, the transposition memory configured to buffer and account for timing of output data from one engine relative to input data to another engine.

9. The device of claim 8, wherein the processor is configured to transform a set of blocks of video data in a pipelined manner, and wherein the first engine and second engine operate simultaneously for at least part of the pipeline.

10. The device of claim 8, wherein the processor is configured to:
    track index values associated with the input data relative to the output data; and
    arrange the input data relative to the output data via the index values.

11. The device of claim 7, the processor further comprises a set of transposition registers coupled between the first engine and the second engine, the set of transposition registers configured to buffer and account for timing of output data from one engine relative to input data to another engine.

12. The device of claim 11, wherein the processor is configured to transform a set of blocks of video data in a pipelined manner, and wherein the first engine and second engine operate simultaneously for at least part of the pipeline.

13. The device of claim 11, wherein the processor is configured to:
    track index values associated with the input data relative to the output data; and
    arrange the input data relative to the output data via the index values.

14. The device of claim 1, wherein the device comprises a wireless communication device.

15. The device of claim 1, wherein the device comprises a high definition television (HDTV).

16. The device of claim 1,
    wherein the blocks of video data comprise 4 by 4 pixel blocks,
    wherein the processor is configured to generate an intermediate result based on 1-dimensional transforms on columns of the 4 by 4 pixel blocks, the processor further configured to transform a row of the intermediate results using a 1-dimensional transform, and
    wherein the re-used computations comprise at least some of the intermediate results.

17. The device of claim 1, wherein the first block of video data includes another portion of video data that is included in the second block of video data.

18. A method of transforming blocks of video data from pixel values to frequency values in an electronic device, the method comprising:
    obtaining a result stored in a memory of the electronic device, the result generated via a first iteration of a transformation process applied to a first block of video data included in the blocks of video data; and
    transforming, via the electronic device via the transformation process, a second block of video data included in the blocks of video data via a second iteration of the transformation process, the transforming based in part on the obtained result, wherein the first block of video data includes at least one portion of video data that is not included in the second block of video data and wherein the second block of video data includes at least one portion of video data that is not included in the first block of video data.

19. The method of claim 18,
    wherein the blocks of video data comprise 4 by 4 pixel blocks,
    wherein the transformations comprise 1-dimensional transforms on rows of the 4 by 4 pixel blocks to generate intermediate results and 1-dimensional transforms on a column of the intermediate results, and
    wherein the re-used computations comprise at least some of the intermediate results.

20. The method of claim 18,
    wherein the blocks of video data comprise 4 by 4 pixel blocks, wherein the transformations comprise 1-dimensional transforms on columns of the 4 by 4 pixel blocks to generate intermediate results and 1-dimensional transforms on a row of the intermediate results, and wherein the re-used computations comprise at least some of the intermediate results.

21. A device comprising:

means for obtaining a result, the result generated via a first iteration of a transformation process applied to a first block of video data included in the blocks of video data to convert from pixel values for the first block of video data to frequency values; and means for transforming, via a second iteration of the transformation process, a second block of video data included in the blocks of video data, the transforming based in part on the obtained result, wherein the first block of video data includes at least one portion of video data that is not included in the second block of video data and wherein the second block of video data includes at least one portion of video data that is not included in the first block of video data.

22. The device of claim 21, wherein the blocks of video data comprise 4 by 4 pixel blocks, wherein the means for performing transformations are configured to perform 1-dimensional transforms on rows of the 4 by 4 pixel blocks to generate intermediate results and 1-dimensional transforms on a column of the intermediate results, and wherein the re-used computations comprise at least some of the intermediate results.

23. A non-transitory computer-readable medium comprising instructions that, when executed in a video coding device, cause the device to:

obtain a result stored in a memory of the video coding device, the result generated via a first iteration of a transformation process applied to a first block of video data included in the blocks of video data; and transform, via a second iteration of the transformation process, a second block of video data included in the blocks of video data, the transforming based in part on the obtained result, wherein the first block of video data includes at least one portion of video data that is not included in the second block of video data and wherein the second block of video data includes at least one portion of video data that is not included in the first block of video data.

24. The computer-readable medium of claim 23, wherein the blocks of video data comprise 4 by 4 pixel blocks, wherein the transformations comprise 1-dimensional transforms on rows of the 4 by 4 pixel blocks to generate intermediate results and 1-dimensional transforms on a column of the intermediate results, and wherein the re-used computations comprise at least some of the intermediate results.

25. A digital circuit configured to:

obtain a result stored in a memory of the digital circuit, the result generated via a first iteration of a transformation process applied to a first block of video data included in blocks of video data; and transform, via a second iteration of the transformation process, a second block of video data included in the blocks of video data, the transforming based in part on the obtained result, wherein the first block of video data includes at least one portion of video data that is not included in the second block of video data and wherein the second block of video data includes at least one portion of video data that is not included in the first block of video data.

26. The circuit of claim 25, wherein the blocks of video data comprise 4 by 4 pixel blocks, wherein the instructions causing the transformations cause the device to perform 1-dimensional transforms on rows of the 4 by 4 pixel blocks to generate intermediate results and 1-dimensional transforms on a column of the intermediate results, and wherein the re-used computations comprise at least some of the intermediate results.

27. An electronic device comprising:

a processor configured to transform blocks of video data, the blocks of video data including at least one 4 by 4 pixel block, wherein the processor, in transforming a first block of video data included in the blocks of video data, is configured to:

obtain a result stored in a memory coupled with the processor, the result generated via a transformation process applied to a second block of video data included in the blocks of video data, the transformation process including one of:

one dimensional transforms on a row of pixels in the second block and a one dimensional transform on a column of the transformed row; or one dimensional transforms on a column of pixels in the second block and a one dimensional transform on a row of the transformed column; and transform the first block via the transformation process, the transform based in part on the obtained result;

a first engine configured to transform blocks of video data horizontally;

a second engine configured to transform blocks of video data vertically; and a set of transposition registers coupled between the first engine and the second engine, the set of transposition registers configured to buffer and coordinate timing of output data from one engine relative to input data to another engine.

* * * * *